(12) United States Patent
Lee et al.

(10) Patent No.: US 11,915,179 B2
(45) Date of Patent: Feb. 27, 2024

(54) ARTIFICIAL INTELLIGENCE ACCOUNTABILITY PLATFORM AND EXTENSIONS

(71) Applicant: TALISAI INC., Hercules, CA (US)

(72) Inventors: Joonho Lee, Hercules, CA (US); Jonathan Eric Heigel, Greenville, SC (US); Justin Bakst, Reading, MA (US); Jannifer Cara Jones, Hercules, CA (US)

(73) Assignee: TALISAI INC., Herculues, CA (US)

( * ) Notice: Subject to any disclaimer, the term of this patent is extended or adjusted under 35 U.S.C. 154(b) by 364 days.

(21) Appl. No.: 16/792,137

(22) Filed: Feb. 14, 2020

(65) Prior Publication Data

US 2020/0265356 A1    Aug. 20, 2020

Related U.S. Application Data

(60) Provisional application No. 62/805,822, filed on Feb. 14, 2019.

(51) Int. Cl.
*G06N 20/20* (2019.01)
*G06Q 10/0635* (2023.01)
(Continued)

(52) U.S. Cl.
CPC ....... *G06Q 10/0635* (2013.01); *G06F 3/0482* (2013.01); *G06F 17/18* (2013.01); *G06N 20/20* (2019.01)

(58) Field of Classification Search
None
See application file for complete search history.

(56) References Cited

U.S. PATENT DOCUMENTS 8,245,282 B1 * 8/2012 Buckwalter ........... H04W 12/12
726/4
8,256,004 B1    8/2012 Hill et al.
(Continued)

FOREIGN PATENT DOCUMENTS

JP    2013065105 A  *  4/2013
WO   2020168299       8/2020

OTHER PUBLICATIONS

Henrique et al. "A new tool for assessing the Organizational Risk Maturity: a diagnose matrix" (2014) (http://www.anpad.org.br/admin/pdf/2014_EnANPAD_GOL1737.pdf) (Year: 2014).*
(Continued)

*Primary Examiner* — Sujay Koneru
(74) *Attorney, Agent, or Firm* — SCHWEGMAN LUNDBERG & WOESSNER P.A.

(57) ABSTRACT

Systems and methods of improving AI governance are disclosed. One or more sub-contexts associated with a plurality of users are generated from one or more data sources. The one or more sub-contexts represent one or more changes in data that are relevant to assessing one or more risks associated with the plurality of users. One or more sub-contexts are provided as training data to a plurality of models. Each of the models is associated with a confidence score. A probabilistic assessment of the one or more risks associated with the plurality of users is generated based on an application of the plurality of models to additional data pertaining to the plurality of users received in real time. The probabilistic assessment is presented in a dashboard user interface, the dashboard user interface having user interface elements configured to provide insight into how the probabilistic assessment was generated.

20 Claims, 30 Drawing Sheets

(51) Int. Cl.
   *G06F 3/0482*        (2013.01)
   *G06F 17/18*         (2006.01)

(56) References Cited

U.S. PATENT DOCUMENTS

| | | | | |
|---|---|---|---|---|
| 8,942,917 | B2* | 1/2015 | Chrysanthakopoulos | G06F 16/7837 |
| | | | | 701/410 |
| 10,462,172 | B1* | 10/2019 | Sadaghiani | H04L 63/1425 |
| 10,497,250 | B1* | 12/2019 | Hayward | G06F 16/29 |
| 10,504,028 | B1* | 12/2019 | Jackson | G06N 20/10 |
| 10,552,750 | B1* | 2/2020 | Raghavan | G06Q 30/0639 |
| 10,937,263 | B1* | 3/2021 | Tout | G07C 9/00571 |
| 2003/0009696 | A1* | 1/2003 | Bunker, V | H04L 63/1433 |
| | | | | 726/26 |
| 2003/0176931 | A1* | 9/2003 | Pednault | G06N 7/01 |
| | | | | 700/44 |
| 2004/0015376 | A1* | 1/2004 | Zhu | G06Q 10/0635 |
| | | | | 705/7.28 |
| 2008/0140576 | A1* | 6/2008 | Lewis | G06Q 30/02 |
| | | | | 707/999.107 |
| 2008/0243479 | A1* | 10/2008 | Cafarella | G06F 16/358 |
| | | | | 707/E17.093 |
| 2009/0106015 | A1* | 4/2009 | Li | G06F 40/44 |
| | | | | 704/E15.012 |
| 2010/0114634 | A1* | 5/2010 | Christiansen | G06Q 30/018 |
| | | | | 705/317 |
| 2010/0312386 | A1* | 12/2010 | Chrysanthakopoulos | G06V 10/814 |
| | | | | 901/1 |
| 2011/0320454 | A1* | 12/2011 | Hill | G06V 10/765 |
| | | | | 707/E17.046 |
| 2012/0030767 | A1* | 2/2012 | Rippert, Jr. | G06Q 10/10 |
| | | | | 726/25 |
| 2012/0072247 | A1* | 3/2012 | Rosauer | G06Q 10/067 |
| | | | | 705/348 |
| 2014/0372350 | A1* | 12/2014 | Armon-Kest | G06Q 30/02 |
| | | | | 706/12 |
| 2016/0171398 | A1 | 6/2016 | Eder | |
| 2016/0180150 | A1* | 6/2016 | Negi | G06V 40/45 |
| | | | | 382/118 |
| 2016/0224803 | A1* | 8/2016 | Frank | G06F 21/6245 |
| 2017/0140124 | A1* | 5/2017 | Sehgal | A61B 8/0825 |
| 2017/0262635 | A1* | 9/2017 | Strauss | G06N 20/00 |
| 2017/0372232 | A1* | 12/2017 | Maughan | G06F 3/0482 |
| 2018/0053115 | A1* | 2/2018 | Vachhani | G06Q 30/0204 |
| 2018/0124091 | A1* | 5/2018 | Sweeney | H04L 63/1425 |
| 2018/0210925 | A1* | 7/2018 | Raghavan | G06F 16/2365 |
| 2018/0324297 | A1* | 11/2018 | Kent | H04M 3/436 |
| 2018/0336284 | A1* | 11/2018 | Agnoli | G04F 10/00 |
| 2018/0357559 | A1* | 12/2018 | Truong | G06N 20/00 |
| 2019/0066243 | A1* | 2/2019 | Watkins, Jr. | G06Q 10/0639 |
| 2019/0147376 | A1* | 5/2019 | Mahabir | G06Q 10/0635 |
| | | | | 705/7.28 |
| 2019/0236249 | A1* | 8/2019 | Pavlou | G06F 21/554 |
| 2019/0349351 | A1* | 11/2019 | Verma | H04L 63/08 |
| 2020/0053111 | A1* | 2/2020 | Jakobsson | H04L 63/1416 |

OTHER PUBLICATIONS

"International Application Serial No. PCT US2020 018442, International Search Report dated Apr. 29, 2020", 2 pgs.
"International Application Serial No. PCT US2020 018442, Written Opinion dated Apr. 29, 2020", 5 pgs.
"International Application Serial No. PCT US2020 018442, International Preliminary Report on Patentability dated Jun. 15, 2021", 6 pgs.
"International Application Serial No. PCT US2020 018442, Response to Written Opinion filed Dec. 14, 2020 to Written Opinion dated Apr. 29, 2020", 9 pgs.

* cited by examiner

EXAMPLE: THREE TIME SERIES THREADS FROM ONE ANALYTIC / AI CODE: THIS EXAMPLE SHOWS, 1) A CODE WAS SUBMITTED TO RUN ON 1/1. THE CODE IS SCHEDULE TO RUN DAILY BASIS. 2) ON 1/4, BEACON DETECTED ANOMALY AND ALERT RECORD WAS DETECTED. 3) & 4) CODE WAS FIXED AND SUBMITTED AGAIN ON 1/5. 5) THE NEXT VERSION OF CODE RAN ON 1/6, 6) ON 1/7, A PREDICTIVE ALERT WAS GENERATED

| FIELD | DESCRIPTION |
|---|---|
| FACTORS | AI FACTORS AND VARIABLES TO MACHINE LEARNING |
| DECISION TREE | POINTS IN THE CODE WHERE DECISION TREE IS BEING MADE |
| STATE | STATE MACHINE AND ITS POSSIBLE VALUE |
| INPUT BLOCK | INPUT VARIABLES, MESSAGES FROM OTHER AI CODES |
| ASSUMPTIONS | ASSUMED VARIABLE VALUES |
| DATA SET USED | TABLE NAMES, LOGICAL SOURCE, FIELD NAMES, DATASET INDEX |
| QUERY USED | ANY DATABASE QUERY |
| INTEGRITY | HASH VALUE OF THE DATABASE |
| OUTPUT | OUTPUT VARIABLES |
| GUARD RAIL | ONTOLOGY OF THE DATA DEFINING ALLOWED OUTPUT |
| CODE ID | IDENTIFICATION OF THE AI CODE |
| TIME STAMP | DATE AND TIME WHEN THE CODE EXECUTED DURING THE RUN TIME OR WHEN THE CODE WAS SUBMITTED FOR TALISAI TO PROCESS (OFF LINE) |
| WHO | NAME OF THE PEOPLE WHO CONTRIBUTED TO THE AI CODE |
| COMMENTS | DESCRIPTION OF M WHAT THE CODE IS MEANT TO DO |

FIG. 18

ARTIFICIAL INTELLIGENCE ACCOUNTABILITY PLATFORM AND EXTENSIONS

CROSS-REFERENCE TO RELATED APPLICATIONS

This application claims the priority benefit of U.S. patent application Ser. No. 62/805,822, filed. Feb. 14, 2019, which is incorporated by reference herein in its entirety.

TECHNICAL FIELD

The present application relates generally to the technical field of artificial intelligence, and, in one specific example, to methods, systems, and computer-readable mediums having instructions for improving governance of artificial intelligence algorithms or applications executing in computing environments of an organization.

BACKGROUND

We are rapidly entering an era in which use of Artificial Intelligence (AI) is the norm in a range of economic and social activities. The advantages of AI technologies are well documented, with AI expanding into mission-critical functions and/or creating entirely new industries. For example, use of advanced analytical technologies, including AI, can give an organization a competitive advantage within the Financial Services industry, which is increasingly incorporating AI in day-to-day operations. Some AI use cases that have been adopted to date have focused on deterministic scenarios or those with a controlled downside around regulatory and reputational risk. With decision-making processes supported by data-driven analysis gaining momentum, the competitive and regulatory landscape is changing accordingly. Organizations now recognize that data is currently and will inarguably be their most important asset in the future. The volume and complexity of data have grown exponentially, and, at the same time, industries have been investing in advanced technologies such as big data analytics, unstructured-data analytics, and machine learning. However, some implementations have not been adopted specially in critical business processes due to various concerns, such as lack of trust, lack of audit-ability, and lack of monitoring.

BRIEF DESCRIPTION OF THE DRAWINGS

Some embodiments are illustrated by way of example and not limitation in the figures of the accompanying drawings.

FIG. 18 is a block diagram depicting a block data structure used by the AI platform.

DETAILED DESCRIPTION

Figure 1:
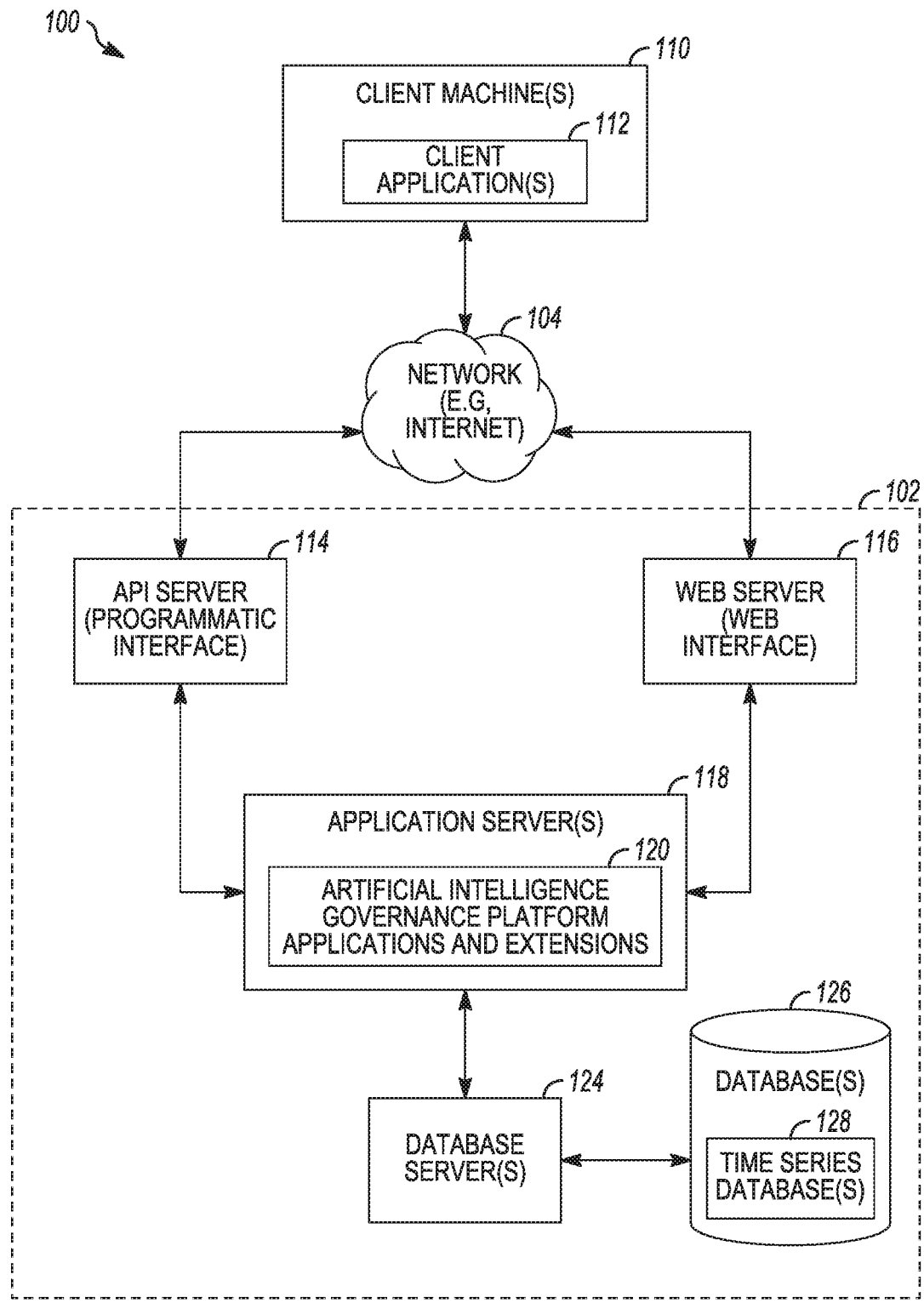
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

AI technologies are evolving at hard-to-comprehend velocities and scale while, at the same time, playing a more and more significant role in high-risk activities like health care, finance, and operations activities. With these advancements, an entirely new segment of risk management is emerging. At is exposing organizations to dangerous new risks and these risks are magnified in regulated industries such as financial services and health care. Advanced software algorithms are making critical strategic decisions, with less and less human supervision and oversight as time passes. As a result, these algorithms often lack transparency and have characteristics of opaque analytical "black boxes."

The current risk-management approaches are insufficient for the next wave of breakthrough technologies, including AI and, in one example, execution of smart contracts in a blockchain-based system. The challenge may appear to be a deficiency in specific areas—e.g., risk-management processes, data science expertise, or IT controls but—in reality, the entire organization owns these new, emerging risks. Organizations that have adopted or are considering adopting AI, such as financial institutions, are not appropriately prepared for the uncertainties inherent in AI advancements.

Techniques to address AI risks, including those associated with lack of transparency or accountability of AI algorithms, may be referred to as "responsible AI" or "AI governance" techniques.

The disconnect between algorithm output and business objectives are likely to continue to widen as the size and velocity of data grow and innovations advance. For example, the volume, velocity, and complexity of data are all increasing. Therefore, the management of this data is becoming beyond human capabilities to manage without the aid of advanced tools. For example, the capabilities of bank executives and regulators are rapidly expanding, but more clarity is needed around model behavior, key assumptions, and data inputs. The old adage "garbage-in-garbage-out" can have dire consequences in AI-powered systems. Organizations (e.g., banks) not only must evaluate these risks from financial, operational, and regulatory perspectives, but, also, from a shareholder responsibility perspective. Models are rapidly becoming a key part of the decision-making process (e.g., in financial services).

The tools, techniques, technologies, and methodologies disclosed herein include non-routine and/or unconventional operations, performed individually or in combination, to provide a robust and independent oversight platform (also referred to herein as "TalisAI," "AI platform," "Talisai Saas Platform"), including a product suite and various extensions. This platform and its extensions improve governance, including monitoring, of complex AI algorithms both before deployment and during run-time operations, and provide better management of these algorithms in a complex data environment. The platform is designed to be synergistic with an organization's long-term strategic visions and therefore associated with a clear return on investment (ROI). For example, the platform may offer insights into customer behavioral trends that were once unimaginable, from predicting future banking needs to uncovering potential risks associated with particular customers. This best-in-class AI governance implementation is configured to create revenue and new business opportunities while simultaneously educating regulators around the downside risks. As education evolves, risks diminish, resulting in faster innovation. Transparency in these innovative efforts is often required (e.g., by regulators or an organization's internal compliance or risk management professionals). Organizations are often burdened by the necessary transparency. However, creating the transparency is more than simply a regulatory exercise; instead, it allows banks to better serve customers and become innovation hubs in their own right.

In example embodiments, systems and methods of improving AI governance are disclosed. One or more sub-contexts associated with a plurality of users are generated from one or more data sources. The one or more sub-contexts represent one or more changes in data that are relevant to assessing one or more risks associated with the plurality of users. One or more sub-contexts are provided as training data to a plurality of models. Each of the models is associated with a confidence score. A probabilistic assessment of the one or more risks associated with the plurality of users is generated based on an application of the plurality of models to additional data pertaining to the plurality of users received in real time. The probabilistic assessment is presented in a dashboard user interface, the dashboard user interface having user interface elements configured to provide insight into how the probabilistic assessment was generated.

In example embodiments, the presenting of the probabilistic assessment includes providing a visual representation of a hierarchy of assets used to perform the generating of the probabilistic assessment, the assets including one or more tasks, one or metrics, one or more algorithms, and one or more data sources.

In example embodiments, the visual representations include selectable user interface elements corresponding to a number of the one or more tasks, a number of the one or more algorithms, and a number of the one or more data sources.

In example embodiments, each of the selectable user interface elements is configured to cause a presentation in the dashboard user interface of a different view of the assets based on a selected level of the assets within the hierarchy.

In example embodiments, the confidence score associated with each model is based on a maturity of the model.

In example embodiments, the one or more risks pertain to stealing of corporate assets or being negligible.

In example embodiments, the generating of the probabilistic assessment includes combining output from the plurality of models into a combined context.

FIG. 1 is a network diagram depicting a system 100 within which various example embodiments may be deployed. A networked system 102, in the example form of a cloud-based or other networked system, provides server-side functionality, via a network 104 (e.g., Local Area Network (LAN), the Internet or Wide Area Network (WAN)) to one or more client machines 110. FIG. 1 illustrates client application(s) 112 on the client machines 110. Examples of client application(s) 112 may include one or more digital assistants, as described below. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more AI governance platform 120, including its applications and extensions, as described in more detail below. The application servers 118 are, in turn, shown to be coupled to one or more database servers 124 that facilitate access to one or more databases 126 or data stores, such as relational databases, including PostgreSQL, or non-relational data stores, including MongoDB. In example embodiments, the database(s) 126 include an implementation of one or more immutable and cross referenceable time series databases 128, which comprise a significant enhancement over known blockchain technologies, as described in more detail herein.

While the AI governance platform application(s) are shown in FIG. 1 to form part of the networked system 102, in alternative embodiments, the applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various applications 120 could also be implemented as standalone software programs, which do not necessarily have networking capabilities. Additionally, although FIG. 1 depicts machines 110 as interfacing with a single networked system 102, it will be readily apparent to one skilled in the art that client machines 110, as well as client applications 112, may interface with multiple networked systems, such as payment applications associated with multiple payment processors or acquiring banks (e.g., PayPal, Visa, MasterCard, and American Express).

The client machine(s) 110 may access the various applications 120 via the web interface supported by the web server 116. Similarly, native applications executing on the client machine(s) 110 may access the various services and functions provided by the applications 120 via the programmatic interface provided by the API server 114. For example, the third-party applications may, utilizing information retrieved from the networked system 102, support one or more features or functions on a website hosted by the third party. The third-party website may, for example, provide one or more promotional, marketplace or payment functions that are integrated into or supported by relevant applications of the networked system 102.

The AI governance platform applications 120 may be hosted on dedicated or shared server machines (not shown) that use a transport protocol, for example HHTP, to enable communications between server machines. The AI governance platform applications 120 themselves are communicatively coupled (e.g., via appropriate interfaces) to each other and to various data sources, so as to allow information to be passed between the AI governance platform applications 120 and so as to allow the AI governance platform applications 120 to share and access common data. The AI governance platform applications 120 may furthermore access one or more databases 126 via the database servers 124.

Figure 2:
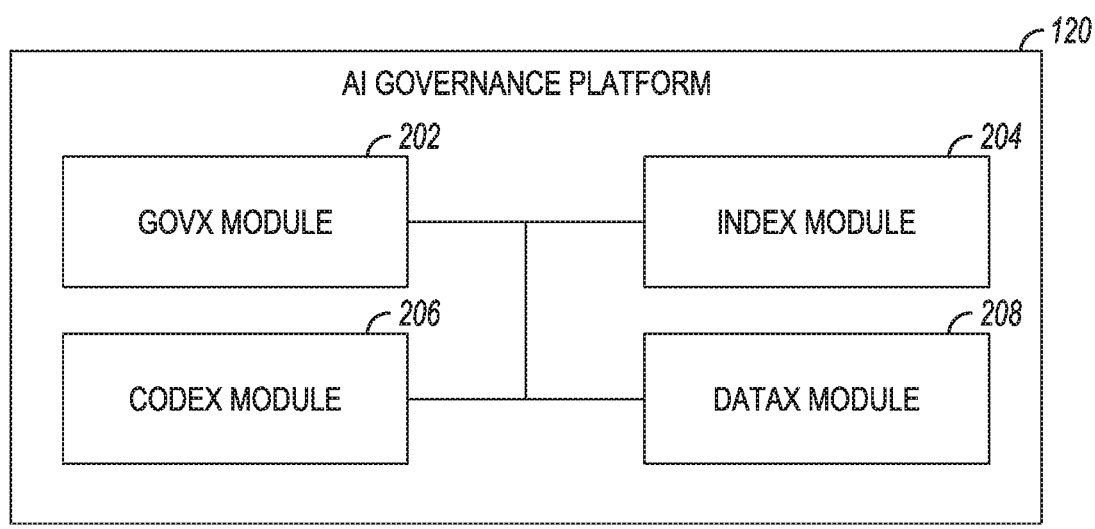
FIG. 2 is a block diagram illustrating example modules of the AI governance platform of FIG. 1.

FIG. 2 is a block diagram illustrating example modules of an AI governance platform. In example embodiments, the platform addresses a need for AI to be aggregated and organized in one place, understood, and managed proactively as AI tasks multiply and become more mission centric. As AI replaces and augments human tasks, the platform ensures essential integrity, performance, and accountability of AI tasks, reducing or virtually eliminating the black box. The platform is an agnostic platform that functions across all systems that leverage AI. The platform uniquely bridges gaps between people decision-making processes and AI-based decision automation.

Gartner Inc. has defined AI. as "[t]echnology that appears to emulate human performance typically by learning, coming to its own conclusions, appearing to understand complex content, engaging in natural dialogs with people, enhancing human cognitive performance (also known as cognitive computing) or replacing people on execution of nonroutine tasks." While this definition is useful, it should be understood that the platform disclosed herein is applicable to all data driven business automation and analytical efforts regardless of whether they fall squarely within this definition or not.

As an example, the banking industry has entered a new frontier of risk management, with AI disrupting the traditional banking model. Today's technology is transforming all facets of the conventional banking model, from compliance and risk management to customer service and portfolio management. AI use cases in banking are growing daily, specifically with respect to revenue generating activities, improved customer experiences, operating efficiencies and regulatory compliance. As a result, many business line leaders may not have a full appreciation of the breadth and depth of the advances that have been made in these areas.

Challenges faced by data-driven businesses in regulated industries, such as the financial industry, may include one or more of the following:

Advanced analytics not yet meeting business objectives;
Lack of transparency with respect to data quality, availability, and sources;
Lack of traceability in the data driven decision support process;
Inability to replay or simulate a critical business decision in a systemically repeatable manner; or
Exposure of the analytic engine, e.g., the "brain," to an insider threat.

These concerns can prevent organizations from rapidly adopting or investing in advanced analytic capabilities, including AI, and from earning ROI from such adoption or investments. For some companies that have invested in general business process-improvement strategies, ROI may have been suboptimal, as many processes are dependent on the quality of the underlying data. These challenges also impact the effectiveness of institutions' risk-management programs. The industry's top concerns, including corporate governance, data quality, cybersecurity, employee's conducts, and volatility in financial products, may be significantly influenced by these challenges.

AI business use cases, such as those of financial institutions, may have data-driven business decision-making processes, including computerized processes, that can each be categorized into four components: the business objective itself, key constraints supporting this process, the algorithm(s) generating the particular values of these key constraints, and the data supporting the algorithm(s). These components may be tightly dependent on one another and the overall quality of each AI-driven process depends on the quality of all four components. The platform disclosed herein approaches this holistically in its treatment of each component, emphasizing the relationships of each component to the other three. Accordingly, the platform's solution stack, depicted in FIG. 2, consists of the following modules: DataX 208, which finds, organizes, and measures data usage; CodeX 206, which reviews algorithms and records the target function; IndeX 204, which monitors and records the state of the algorithm as it is running; and GovX 202, which manages key constraints and links to business objectives.

The DataX 208 module is configured to aid algorithm developers and information managers, including chief data officers and chief information officers, organize, find, and measure data usage. DataX 208 converts an organization's data dictionary into an easily searchable and navigable form. It also takes information from the CodeX 206 module (discussed below) to automatically trace data lineage, track sources, measure usage, and compare the latter against the organization's data governance policy. This module is a foundational solution that may apply to many, if not all, business cases in an industry.

The CodeX 206 module is configured to review an algorithm and record its intended function. It also automatically creates records of assumptions and metadata of ingested data sources and key constraints (e.g. algorithmic outputs) The CodeX 206 module tracks changes in code and data lineage. In some cases (e.g., for a large organization in which collaboration among many team members is necessary), the platform may provide a unique blockchain-based solution that will inform and enhance team members collaboration, as explained in more detail below.

The IndeX 204 module is configured to monitor the state of an algorithm as it runs. For example, this module may capture actual values of all variables being used or generated during the code's run. The IndeX 204 module also records code identification, date/time, state of the code (if any), and the hash of the dataset used.

The GovX 202 module is a configurable module that computerized processes or end users can use to link business objectives to key constraints that algorithms generate. This module provides a user with a friendly interface to choose existing key constraints or create new key constraints and present an associated set of algorithms or datasets.

Figure 3A:
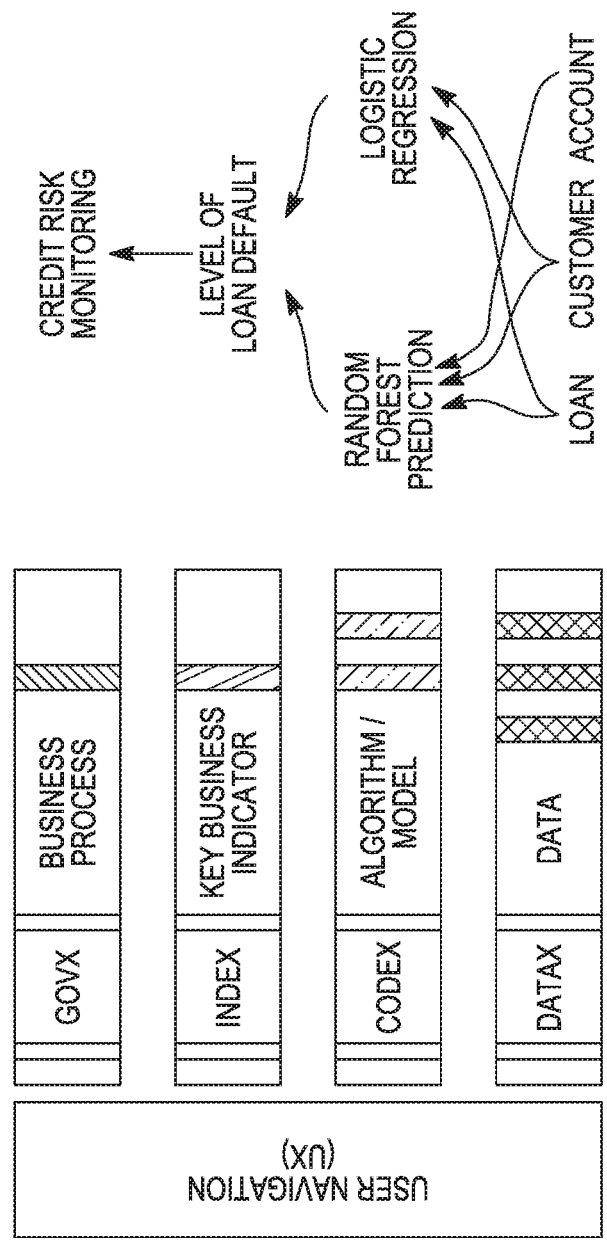
FIG. 3A is a block diagram illustrating an example application of the AI governance platform to the use case of credit risk monitoring.

As shown in FIG. 3A, the platform's solution stack can monitor and track "AI Inside," including the inner workings of AI-based processes dedicated to a particular function (e.g., credit-risk monitoring). These mission-critical processes may be based on a key constraint (e.g., "Level of loan default"), which is predicted or generated by various AI algorithms or techniques (e.g., a Random Forest Prediction and/or a Logistic Regression), which are, in turn, supported by multiple data sets (e.g., loan data, customer data and account data).

Figure 3B:
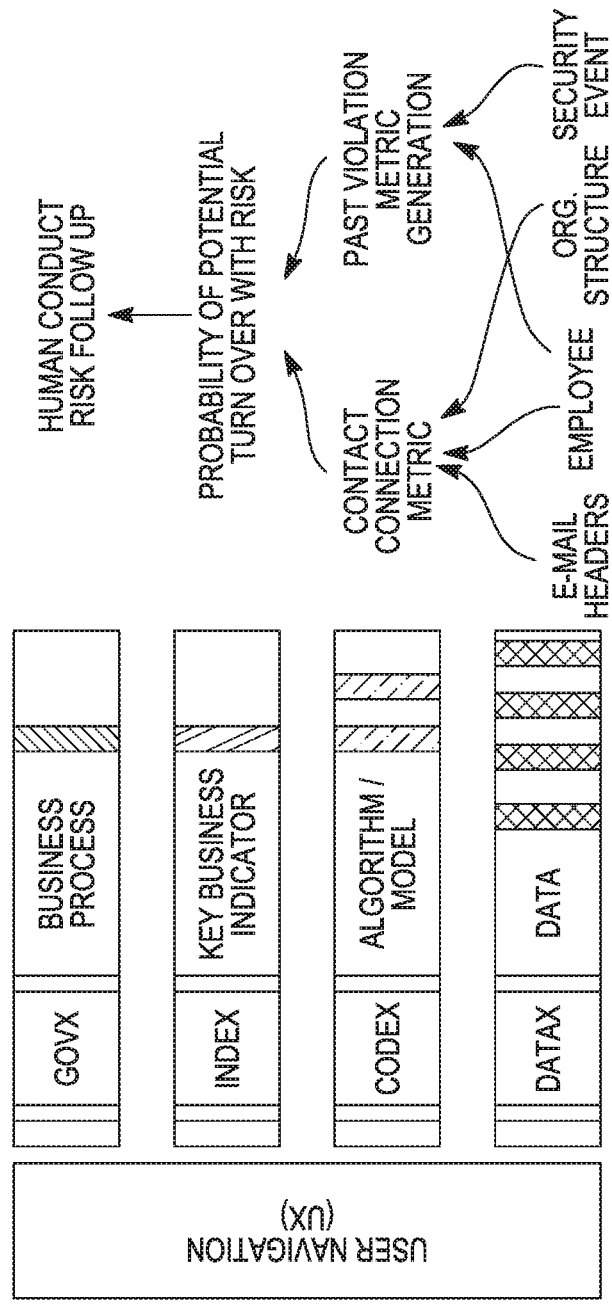
FIG. 3B is a block diagram illustrating an example application of the AI governance platform to the use case of risks pertaining to cybersecurity involving human conduct.

FIG. 3B depicts an application of the platform's solution stack to a different function—specifically, risk management related to employee malfeasance. As in the credit risk monitoring example discussed above, the platform's solution guards against risk based on employee conduct by tracking and monitoring the underlying relevant key constraints. Here, an example constraint is the probability of the employee leaving the bank's employ. The AI algorithms include "contact connection metric" and "past violation metric generation" algorithms. The data includes e-mail headers, employee information, organizational structure, and security events.

Although different organizations may approach their challenges differently, resulting in diverse business use cases, some common themes may exist around strategic initiatives designed to enhance data-driven businesses. For example, an approach may be categorized as a "bottom-up approach starting from the data asset" or as a "top-down approach from the business objective."

Figure 3C:
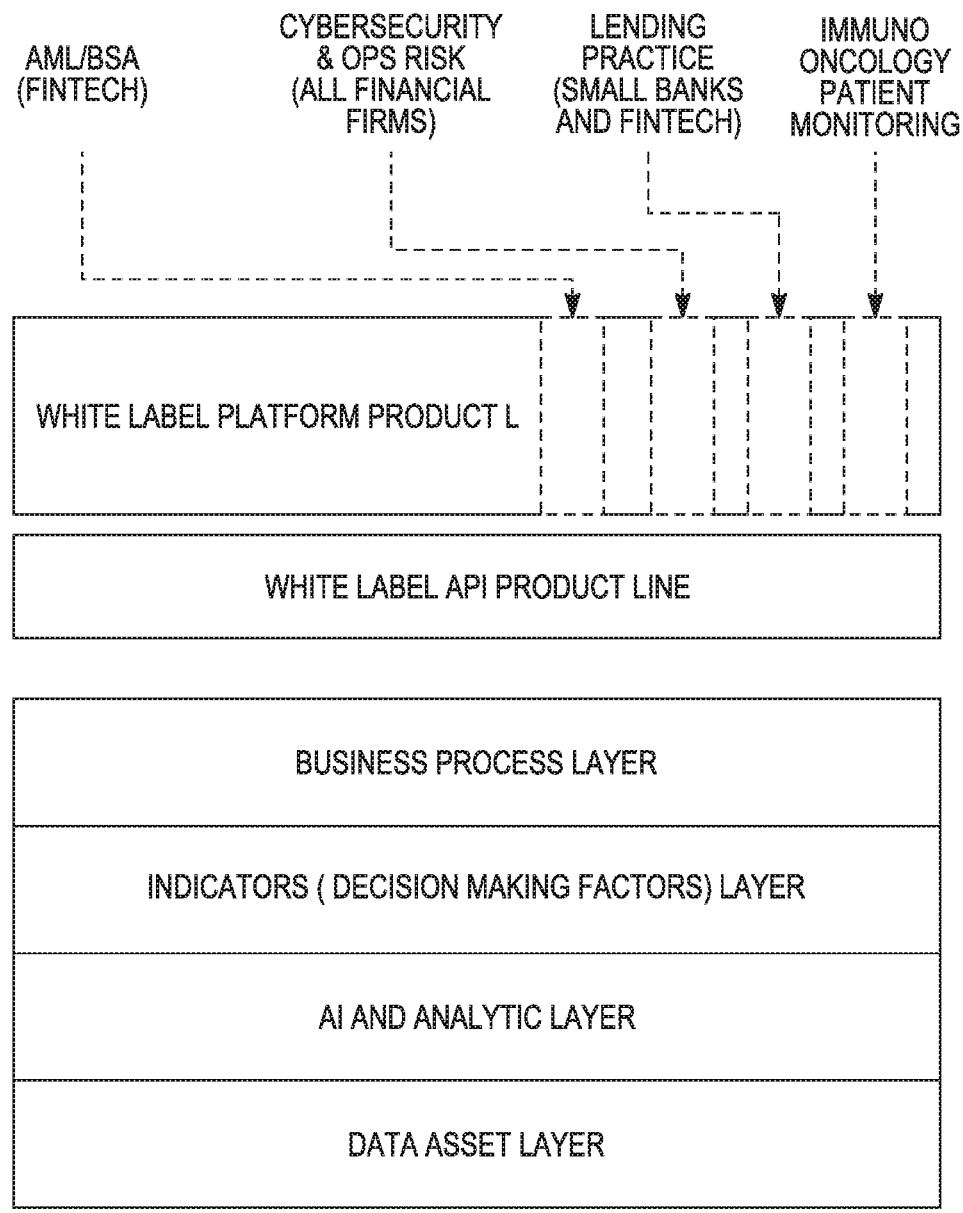
FIG. 3C is a block diagram illustrating additional example applications of the AI governance platform.

FIG. 3C is a block diagram illustrating additional example applications of the AI governance platform. White label platform products may include applications specific to AML/BSA, Cybersecurity & Ops Risk, lending practice, and immunoncology patient monitoring, including the application described in more detail below. Each platform product may also include its own API and be associated with the software stack depicted and described with respect to FIGS. 3A and 3B.

Figure 4:
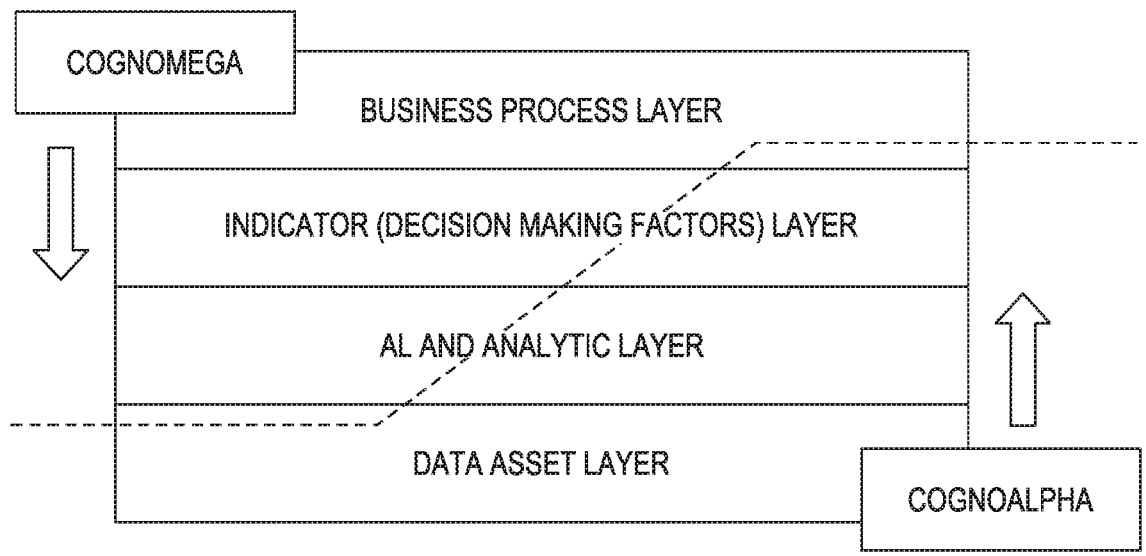
FIG. 4 is a block diagram illustrating a two-prong approach for deployment of the AI governance platform within a computer environment of an organization.

As depicted in FIG. 4, in approaches using the bottom-up strategy, organizations may have strategically tackled information at the asset level by implementing a data and analytic program and then worked to improve its ability to support business decision-making processes. In approaches using the top-down strategy, organizations may have strategically tackled efficiency and effectiveness of existing business objectives, including those implemented as computerized processes, and then worked to better connect data and algorithmic capability.

While the two approaches may result in different business use cases exhibiting varying degrees of expected business values, they may converge on the issue of transparency or on execution challenges that were caused by, for example, (1) lack of governance over data and algorithms, (2) lack of monitoring during the running of the algorithms, or (3) an uncertain linkage between the business objective for which the algorithms were run and the results generated by the algorithms.

To directly address these challenges, the AI platform disclosed herein provides intelligent insights into a company's business objectives, data analytics efforts, including AT, and underlying information assets. The platform, for example, recognizes and focuses on a critical missing piece: accountability. Accountability mapping at one or more levels, including data, algorithms, processes, and people, is provided to efficiently support the organization's business objectives.

The platform uses either or both of a two-pronged approach, as discussed above (e.g., top-down and/or bottom-up), to align with deployment or use of AI within an organization and to improve the organization's data-driven initiatives. A data and algorithm accountability module (referred to herein as "CognitaAlpha,") the "CognitaAlpha" module, assists organizations that have focused on informational assets and their analytic capabilities. An information analyses management, monitoring, and tracing module (referred to herein as "CognoMega,") the "CognoMega" assists organizations in improving efficiency and effectiveness of the business objectives, including computerized processes, themselves. The two modules can be integrated as one enterprise solution by capturing and connecting the critical business functions and their references to the actual analytics employed and to data usage behavior.

CognoMega

Figure 5:
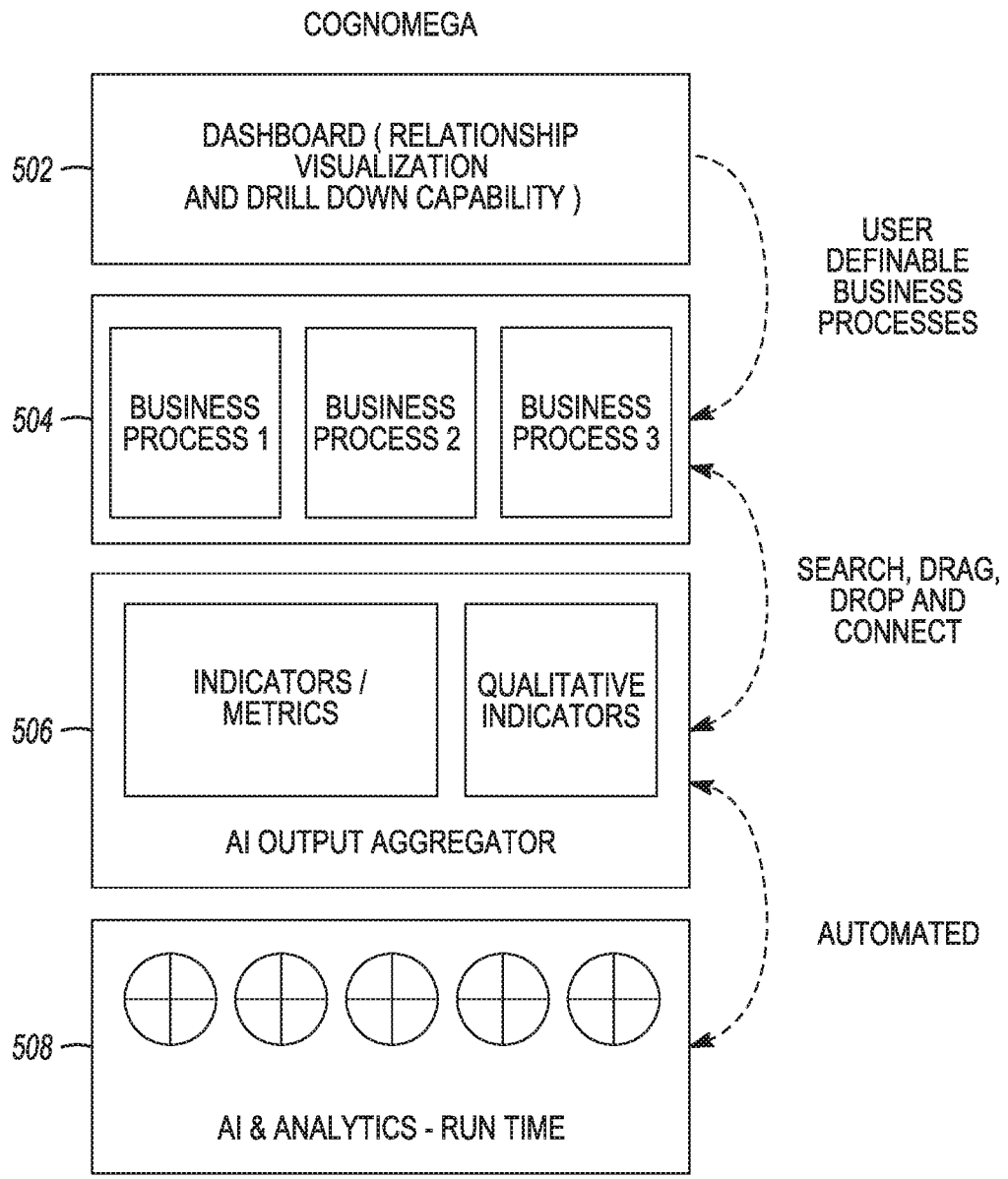
FIG. 5 is a block diagram of the top-down approach for deployment of the AI governance platform within an organization.

As shown in FIG. 5, the CognoMega module is configured to address an organization's ongoing effort to grow and transform its businesses through a data-driven strategy. It also addresses the organization's foundational data-governance and data-management challenges. CognoMega helps organizations find, manage, and track data, algorithms, and the lineage of each. It also tracks usages of both data and algorithm and recommends other data sets and algorithms that could be beneficial to the user's analysis. As an example, organizations can use CognoMega to improve the data analytics or AI effort supporting customer relationship management applications such as robo-advisor or chatbot. CognoMega produces a dashboard or provides an API that enables connections between usage of AI algorithms within the organization to the customer experience. CognoMega has the unique ability to replay historical customer sessions for quality assurance and help better tune the AI.

In example embodiments, the CognoMega dashboard 502 includes relationship visualizations and drill-down capabilities for key constraints and other data associated with business objectives accessible from various front-end tools deployed within an organization. The dashboard may include user interfaces and user interface elements to allow a user to visually associate a business objective with an AI output aggregator 506 (e.g., via search, drag, drop, and connect actions) The AI output aggregator 506 includes key constraints and metrics, including qualitative constraints, that are generated by AI and analytics processes 508 and that are relevant to particular business objectives. In example embodiments, the AI output aggregator 506 includes output based on monitoring of algorithms (e.g., business processes 504) deployed within a computerized environment of the organization, as discussed in more detail below. Therefore, a client process of CognoMega can identify and specify associations between AI processes executing within an organization and data associated with business objectives (e.g., for exposure via one or more front-end tools).

CognoAlpha

CognoAlpha connects an institution's mission-centric functions, such as corporate governance and regulatory compliance functions (e.g., liquidity risk, cybersecurity risk, AML, or fair lending functions). Due to the sensitivity of these functions, an organization may rely on manual processes or on qualitative information (e.g., a report document). However, even for an organization without mature data governance or an advanced analytics capability, CognoAlpha can help the organization manage, monitor, and trace information analyses that support its critical functions through a combination of text analysis, rule-based decision making, machine learning, and data inference technology. CognoAlpha's dashboard view displays a bank's existing processes (e.g., such as the processes 504 depicted in FIG. 5), including the roles of relevant staff members and the layers of critical functions, report documents, references, and datasets.

With the ability to replay and review historical records, users can assign accountability and diagnose and optimize the business objectives and decision support systems that support mission-centric applications. Thus, CognoAlpha rigorously monitors and efficiently manages the information ecosystem driving the AI's analytical outputs.

In example embodiments, an AI output aggregator 604 includes constraints, metrics, qualitative constraints, and so on, that are automatically generated (e.g., based on a pre-processor being executed on one or more data assets (e.g., AI algorithms) deployed within a computer environment of an organization). In example embodiments, the pre-processor is configured to capture an AI record block. In example embodiments, this record block includes one or more data elements relevant to decisions made by the AI algorithm (e.g., such as the factors depicted in FIG. 17). In example embodiments, these data elements are then transmitted to the AI output aggregator for surfacing within a dynamic user interface for governing the AI algorithm.

AI Beacon

An AI algorithm's output may be hard for humans, including developers of AI, themselves) to understand. To address this issue, an AI Beacon (referred to herein interchangeably as the AI Beacon module) is introduced. The AI Beacon lives within the AI algorithm. The AI Beacon knows the baseline output (e.g., based on human-defined desirable boundaries). The AI periodically (e.g., at frequent intervals) communicates with other AI agents (or one or more other deterministic algorithms that can be benchmarked) to monitor AI execution. Then the AI Beacon reports monitoring data to a mothership system. When the AI's output somehow goes out of the defined range, it generates an alert (e.g., for presentation within a user interface of the mothership system). In example embodiments, the AI Beacon generates a Beacon Record (see, e.g., operation 2 of FIG. 17) that identifies any boundary violation that occurs during execution of the AI algorithm (e.g., by comparing outputs to the Guard Rail field of the AI record block). In example embodiments, the AT Beacon record block includes one or more data items, including, for example, one or more outputs generated by execution of the AI algorithm, data and time the one or more outputs were generated, a state machine value (e.g., data representing a state of the AI algorithm), a code identifier (e.g., a code identification number that could be referenced to a real-time execution data block or code structure development data block), a guard rail value (e.g., an expected or allowed range of values corresponding to each of the one or more outputs), a guard rail set reference id (e.g., for complex business rules, the expected or allowed data ontology may be stored in a separate database that is referenced from this data item), or an alert message (e.g., contents of an alert message that is sent to another computer process for further analysis or processing or for presentation in a user interface of a device).

AI Cronus

AI Cronus (referred to herein interchangeably as the AI Cronus module) is also introduced. The AI Cronus module connects runtime AI behavior and development time AI metadata. At development time, the platform extracts meta information about the AI, including the AI's input, output, query, available states of AI, etc. (e.g., at the AI & analytics 606). At runtime, AI Cronus monitors and records its behavior, state, messages, and so on from any machines that are executing a given algorithm (e.g., at the AI & analytics 606). AI Cronus cross references runtime data with expected information that was captured during development time extraction. In example embodiments, the expected information may include human-defined parameters, such as the boundaries discussed above. Playback of an entire state or scenario handled by an algorithm (e.g., including incoming messages, outgoing messages, data used, variables used, and so on) is another feature provided by AI Cronus.

In example embodiments, for development time processing (e.g., at AI & Analytics 608), when a change to the AI algorithm is detected (e.g., via a change log), a new record block (e.g., based on a defined AI block structure) is created. Fields within the new record block are updated to reflect the change to the algorithm. In example embodiments, only those fields that have changed since the last update are populated with data.

In example embodiments, for runtime processing, the record block not only includes metadata, such as metadata captured during development time processing, but also real (e.g., run-time) values corresponding to various fields of the AI block.

In example embodiments, the development time code (e.g., AI & analytics 606) is deployed into the runtime environment using one of three mechanisms: an API called at runtime, platform wrappers, or embedding of code (e.g., through pre-processing). In example embodiments, the embedding of code includes inserting calls to the AI Beacon into the AI algorithm (e.g., at each decision point) upon submission of the code to the platform. With platform wrappers, the AI code is monitored within an environment of the AI platform, to view AI generation, including AI outputs, and call the AI Beacon, With the API mechanism, the AI algorithm includes direct calls to an API of the platform to support governing the AI algorithm based on internally-defined rules.

In example embodiments, AI Cronus looks for unanimous consensus across all instances of a given algorithm, whether is currently running on other machines or was deployed in the past. For example, consider a runtime deployment that gives particular outputs for particular inputs. Replay functionality may be run on each of machines that the algorithm is deployed on. It may also be run on any historical version of the algorithm (e.g., based on code build, date, or other parameters). The outputs from other runtimes and historical versions are compared with the particular outputs of the given runtime system. Any discrepancy may be indicative of anomaly. The identification of the anomaly may then be surfaced via one or more dynamic user interfaces to allow an administrator to drill down into the decision points evaluated in each of the instances relative to the given runtime instance to determine the reason for the discrepancy.

Thus, for example, if a developer's change to an algorithm has an unintended result which leads to an anomaly, the particular change may be quickly identified and communicated to the developer, along with specific information pertaining to the anomaly (e.g., the inputs, the outputs, the violation identified by the AI Beacon, the time/date stamp of the AI record generation, and so on).

As another example, if the anomaly results from a change to a data set, or assumptions pertaining to the data set, a particular difference in the data items of the new data set relative to a previous data set may be identified, allowing appropriate correction to data set or the rules to evaluate the data set to be quickly implemented to correct the anomaly.

Innovative Integration with Blockchain

While many organizational challenges can be solved without blockchain integration, the platform solution stack innovatively modifies some parts of blockchain technology in order to address an organization's challenges more efficiently, including, for example, general industry concerns about the blockchain technology itself. While blockchain technology offers four unique capabilities (immutable record management, consensus-based decentralized exchange, smart contracts, and crypto tokens), the platform leverages the blockchain concept to develop a solution that addresses the real-time traceability and transparency issues.

For example, even where a data governance policy and a top-down approach to data asset management efforts are successful, the platform's blockchain-leveraged solution, which validates data and the analytic assets (e.g., data assets 610) through consensus and smart-contract mechanisms, can make the effectiveness of an organization's algorithms and data assets visible to a broader community of employees and facilitate collaboration across the organization. With this framework, most people, if not all people, in an organization have the potential to protect and add value to what is possibly the company's most valuable asset: its data.

In example embodiments, a multi-threaded blockchain is implemented within the platform. In the multithreaded blockchain, rather than having one long chain of records, multiple (e.g., three) threads of records are implemented for each AI agent. In example embodiments, the records within each thread are in chronological order. In example embodiments, a first thread may be for runtime behavior, a second thread may be for development time records, and a third thread may be for beacon information (e.g., as described above with respect to the AI Beacon). The threads may refer to each other (e.g., via one or more data points, such as a timestamp, code II), etc.). When AI code is newly launched, it may create one genesis block, which then spawns off to three threads. In example embodiments, the genesis block may include a code II), release II), a date time/stamp, or other data for uniquely identifying the block.

In example embodiments, performance-related issues associated with the multi-threaded blockchain (e.g., such as those related to the consensus mechanism) are addressed in the platform's implementation. In example embodiments, the platform's solution to performance-related issues includes randomizing selection of a node (e.g., instead of proof of work) then adding records to the chain only by checking AI code lineage. The platform may log a history of the record addition activities and have a consensus mechanism to validate the lineage. In example embodiments, it may be unlikely that the consensus mechanism will find error in record lineage. However, in batch mode, each blockchain node can do a proactive replay based on the actual data used and see whether there is consensus in reaching the same output. This solution can be thought of as being like having multiple precognitives (or "precogs"), which are computerized processes that possess a psychic ability to see events in the future. In other words, three precogs are used to check whether they agree with a generated outcome.

A new frontier of risks inherent within any information analytics, including AI, are emerging. Thus, the described solution includes machine components that are accountable and responsible when the components recommend, make, or influence any decisions for business and people. The disclosed solution provides automatic, real-time, verifiable analytics/AI with prediction and early warning capability. This solution is to be contrasted with mere system log analysis, which is not automatic, does not verify the analytics, and does not provide any prediction or early warning capability associated with potential output of the analytics.

The disclosed solution creates multiple time series data blocks that are cross-referenceable yet immutable (e.g., in order to organize the record blocks to have end to end lineage supporting the business decisions). For example, the data blocks store information lineage connecting business decisions, metrics, analytics and supporting data. The disclosed solution is not merely a time series database, rather provides for the connection of a record block in vertical with certain relationships in an immutable fashion. The disclosed solution is not merely a generic blockchain solution that includes a single long, but rather a solution that uses blockchain technology to product multiple cross-referenceable blockchain threads.

In order to govern and manage data analytics and AI in real-time, each analytic component (algorithm) should has its own time series with multiple threads such as (1) development (e.g., offline) thread, (2) real-time (e.g., online execution) thread, and (3) risk alert (e.g., beacon) thread. In contrast, a Bitcoin-style implementation or blockchain-based smart contract does not support multiple genesis blocks with multiple threads for each genesis block.

Today, when analytics generate errors or unintended results, businesses and people become aware of the results after they were negatively impacted by it. This situation is worse when the analytics include machine-based learning algorithms. Attempts to address this issue by monitoring the system log and send alerts people based on the log or output from log analysis results in inundating people with many false positives. In order to ensure analytic integrity, more security controls may be added to govern and manage the analytical code. Such solutions are ineffective and inefficient because that output that impacts the business/people could dynamically change even if analytics/AI code were never changed. In contrast, the disclosed solution proactively and continually validates the analytics/AI's performance and its expected performance. The AI governance platform approaches this in at least the following novel ways to catch or predict anomalies in a more timely and more accurate fashion.

(1) Embedding a guard rail data ontology where the outputs of analytics/AI should fall within. If and when an output results something outside of the guard rail data ontology, it provides an early warning.

(2) Automatically replaying the analytics/AI with the same parameters and statically comparing the outputs against the last run replay. If the outputs are same or similar, the analytics/AI are still operating within the boundary of acceptable risk. This output can be also compared against risk or compliance guard rail data ontology. Any slow and minor changes that may impact something significant later will be predicted here.

(3) Creating and running multiple nodes of computers with the same analytics/AI code and the same historical data in a distributed computing environment. If there is at least one computer node resulting a different output, it is an early prediction that the AI code may start learning something different. The prediction analysis is also augmented by changes in assumption variables.

Figure 7:
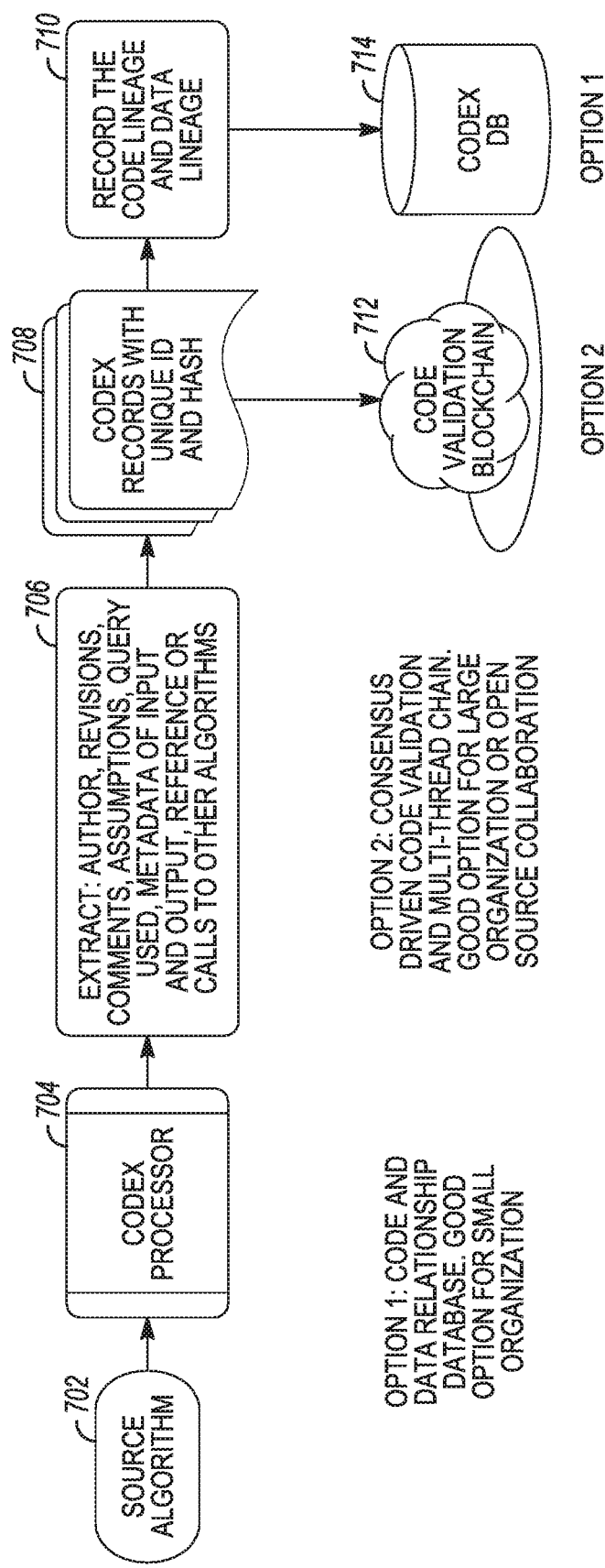
FIG. 7 is a flow diagram of example operations performed by a particular module (e.g., a CodeX module) of the AI platform.

FIG. 7 is a flow diagram of example operations performed by a particular module (e.g., a CodeX module) of the AI platform. At 702, a source algorithm is received at a code pre-processor (e.g., for offline processing). At 704, various attributes and values of the source algorithm are identified, including, for example, values corresponding to the following attributes: author, revision, comments, assumptions (e.g., pre-defined constant values), query used, metadata, inputs, outputs, references, or calls to other algorithms. At 706, at least some of the various attributes are extracted. At 708, as a first option, the various attributes and values may be stored in a code record (e.g., with a unique ID and hash 708) in a code validation blockchain, such as the enhanced blockchain described herein (e.g., in code validation blockchain 712). At 708, as a second option, the code lineage and data lineage may be stored in a data relationship database (e.g., CodeX 712). In example embodiments, the first may be selected for larger organizations (e.g., those have a size, budget, or AI maturity level that transgresses a corresponding threshold) or organizations using collaboration tools, whereas the second option may be selected for smaller organizations.

Figure 8:
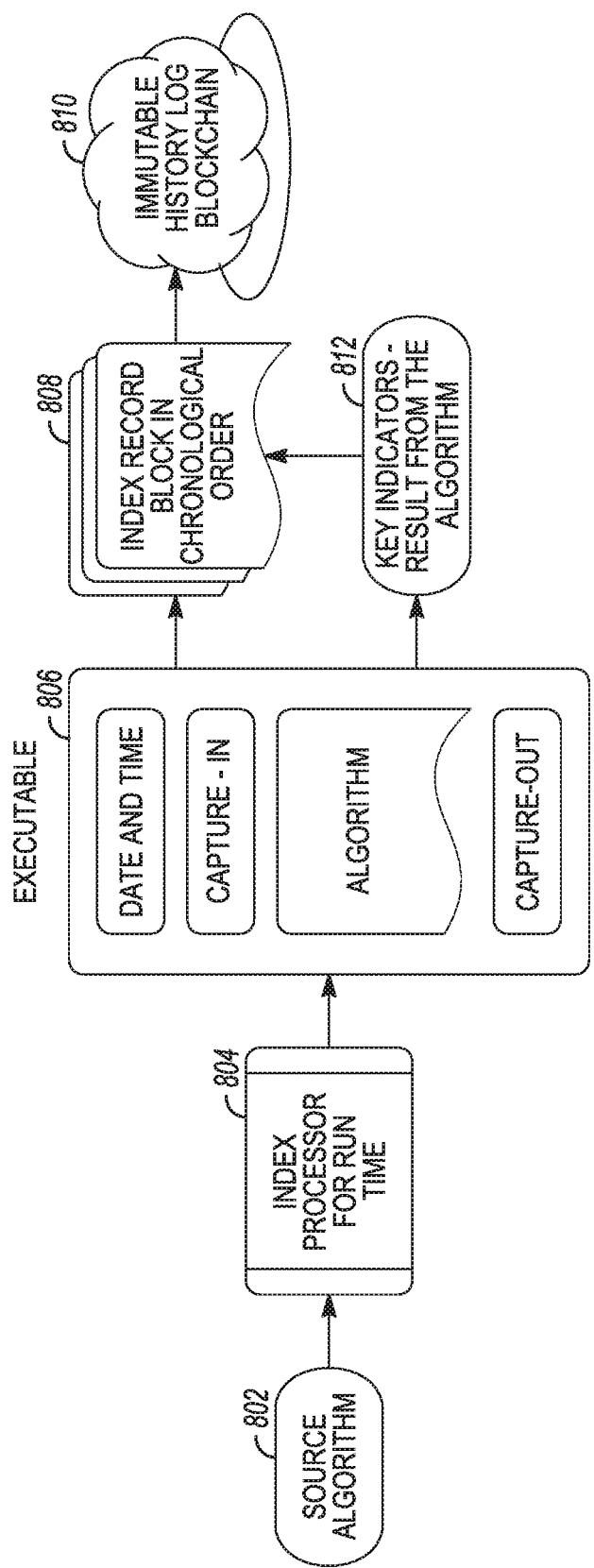
FIG. 8 is a flow diagram of example operations performed by a particular module (e.g., an IndeX module) of the AI platform.

FIG. 8 is a flow diagram of example operations performed by a particular module (e.g., an IndeX module) of the AI platform. At 802, a source algorithm, such as one corresponding to the source algorithm of FIG. 7, is received at an index pre-processor (e.g., at runtime). At 804, inputs and outputs of the algorithm are monitored or captured, along with metadata, such as a date and time of the execution of the algorithm. The result or output of the algorithm (e.g., executable 806) is analyzed to determine values of key constraints used by the algorithm to determine the result. At 808, the gathered data 812, including captured inputs, outputs, values of key constraints, or metadata pertaining to execution of the algorithm are recorded in an index record. Index records may each have a unique identifier (e.g., a date and time stamp) and be stored in a record block in chronological order (e.g., using either of the options discussed above with respect to FIG. 7). Thus, in example embodiments, the records may form an immutable history log represented as a blockchain 810 (e.g., such as one having the enhanced implementation described herein).

Figure 9:
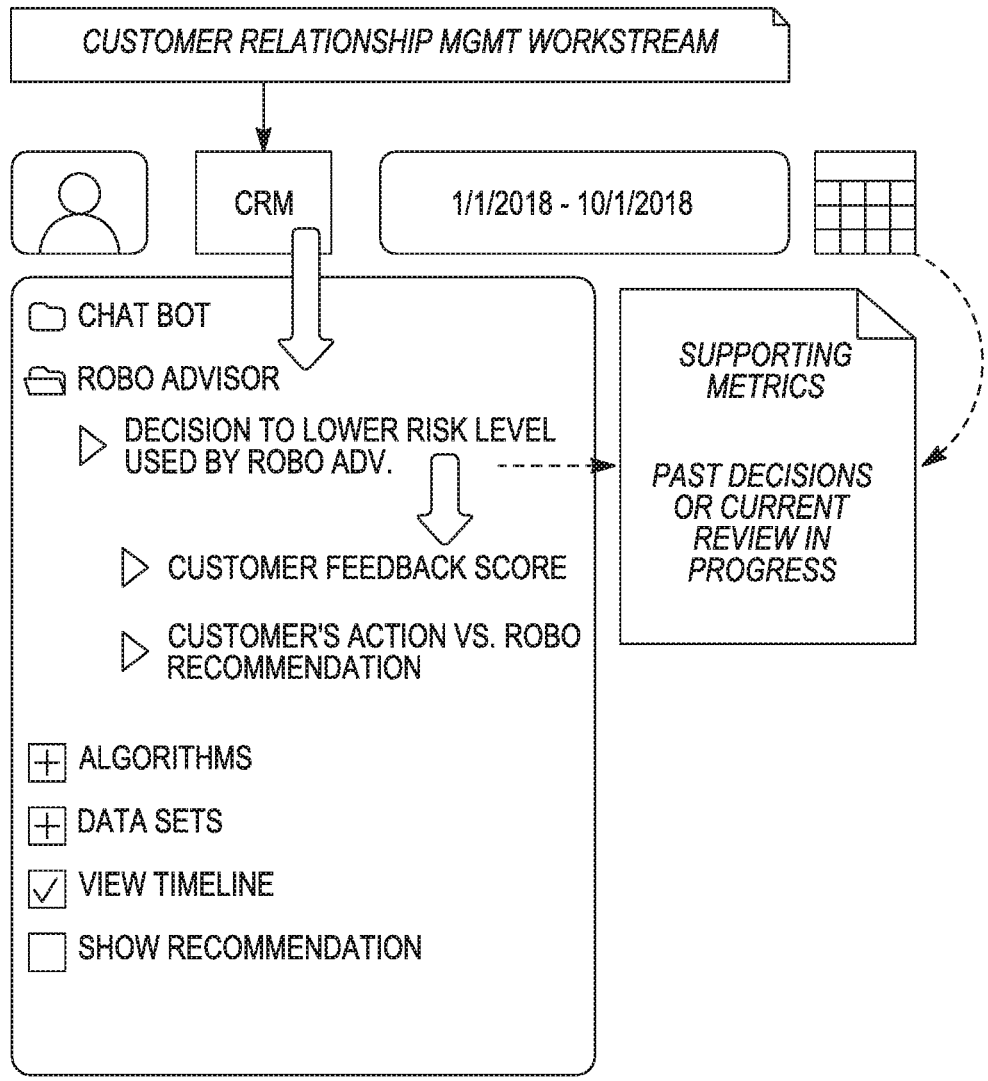
FIG. 9 is a screenshot of an example dynamic user interface presented by the AI governance platform with instant replay capability.

FIG. 9 is a screenshot of an example user interface presented by the AI platform. In this example user interface, a CRM manager is configured to look into a decision made to tune a robo-advisor's recommendation process. This example dashboard user interface may be provided by CognoMega or an application using the CognoMega API. This user interface enables the user to quickly investigate decisions by AI algorithms deployed or used within an organization (e.g., to automatically lower a risk level used by a robo-adviser). The user can find values of key constraints (e.g., "customer feedback score," or "metrics on customer's action versus the robo-advisor's recommendation."). By selecting a date range, the user can instantly see the values of the key constraints over a particular time period for information about how they affected a particular decision. In example embodiments, the user may view the algorithm used to make the decision, the data sets used to make the decision, the timelines over which the decision was made, and a recommendation for an action that is to be performed (e.g., a lowering of a credit risk associated with an individual) based on an application of the algorithm.

To drill down further into the analysis supporting a decision, the user can view historical values of the key constraints (e.g., as captured and stored in the records described above) in a graph form (for example) and select a point in time to replay how the constraints were computed. A navigable visual representation of the total situation at hand will then be available at the user's fingertips, including information, such as names, of the team members who have contributed to the development or execution of the algorithm within a computing environment.

Figure 10:
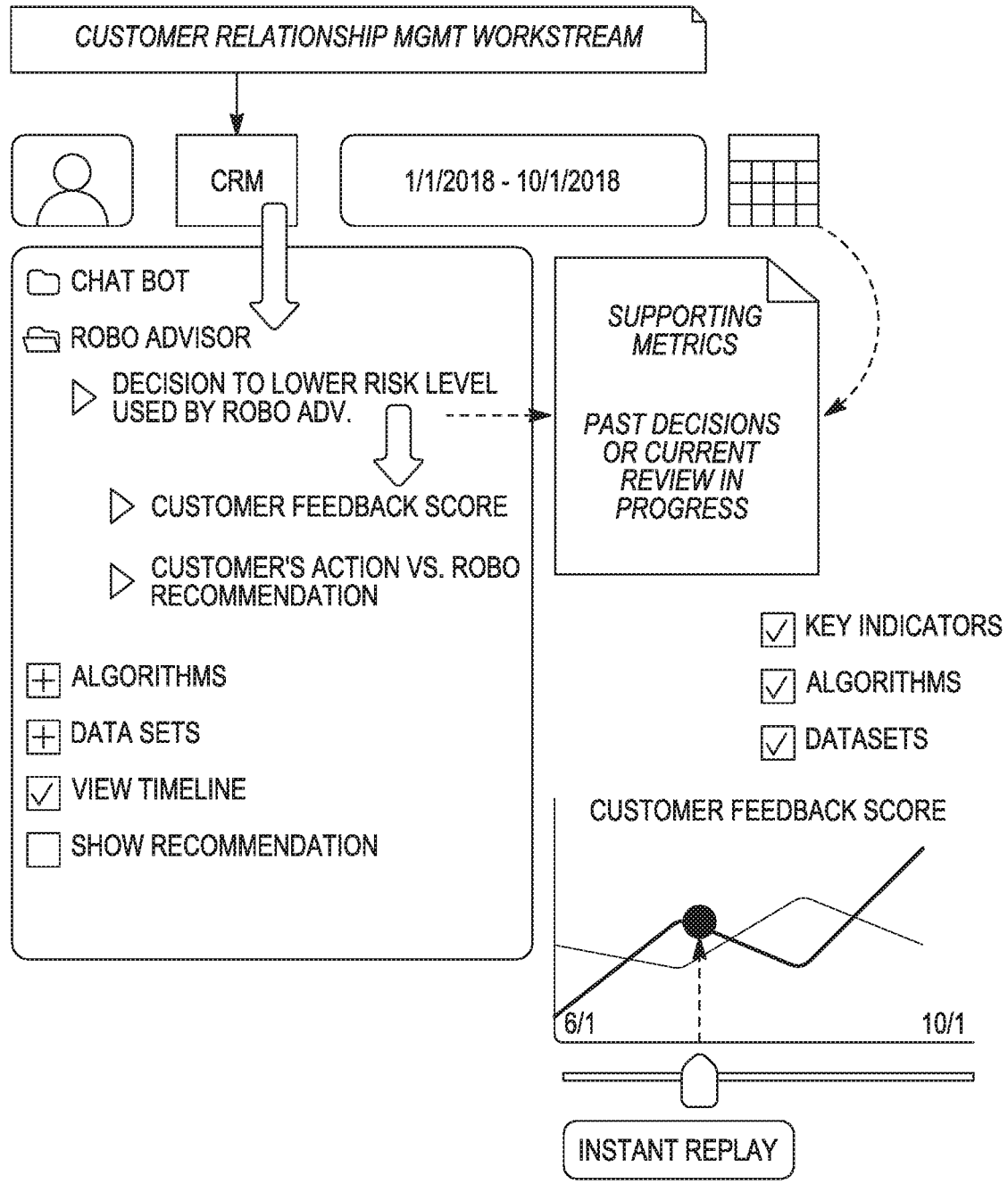
FIG. 10 is a screenshot of an additional example user interface presented by the AI governance platform.

FIG. 10 is a screenshot of an additional example user interface presented by the AI platform. In this example, a user is presented with user interface elements for controlling the "Instant Replay" capability of the AI governance platform. Values of key constraints over a period of time may be viewed during a playback of execution of the algorithm over a time period. A selector user interface element may allow the user to stop or start the play back window or navigate to a particular time period within the playback window. A visualization incorporates selected sets of data pertaining to the execution of the algorithm during the playback window, including, for example, the business owner and the team who contributed to a business process supported by the algorithm, the metrics that were leveraged, and the supporting dataset.

Figure 11:
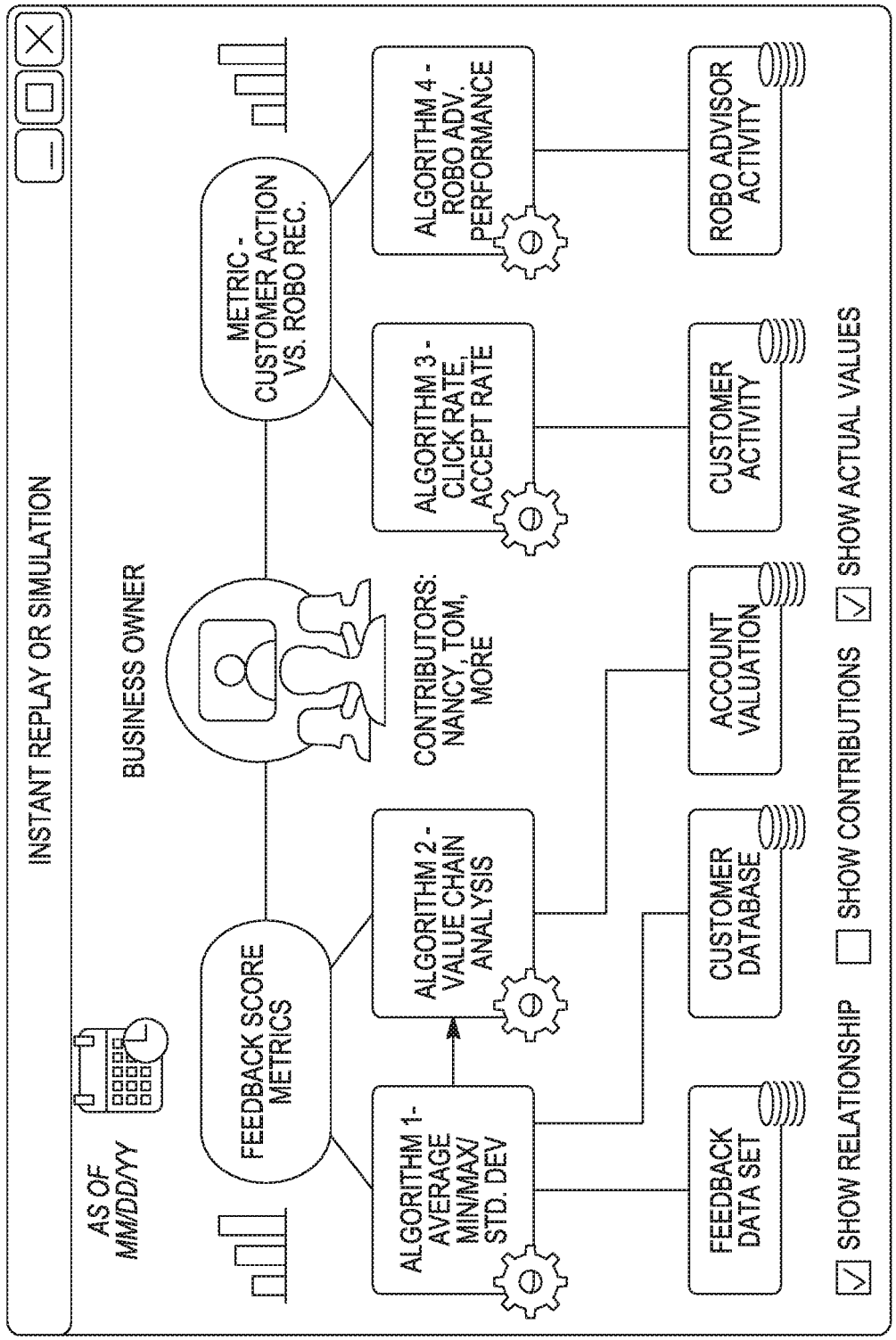
FIG. 11 is a screenshot of an additional example user interface presented the AI governance platform.
Figure 12:
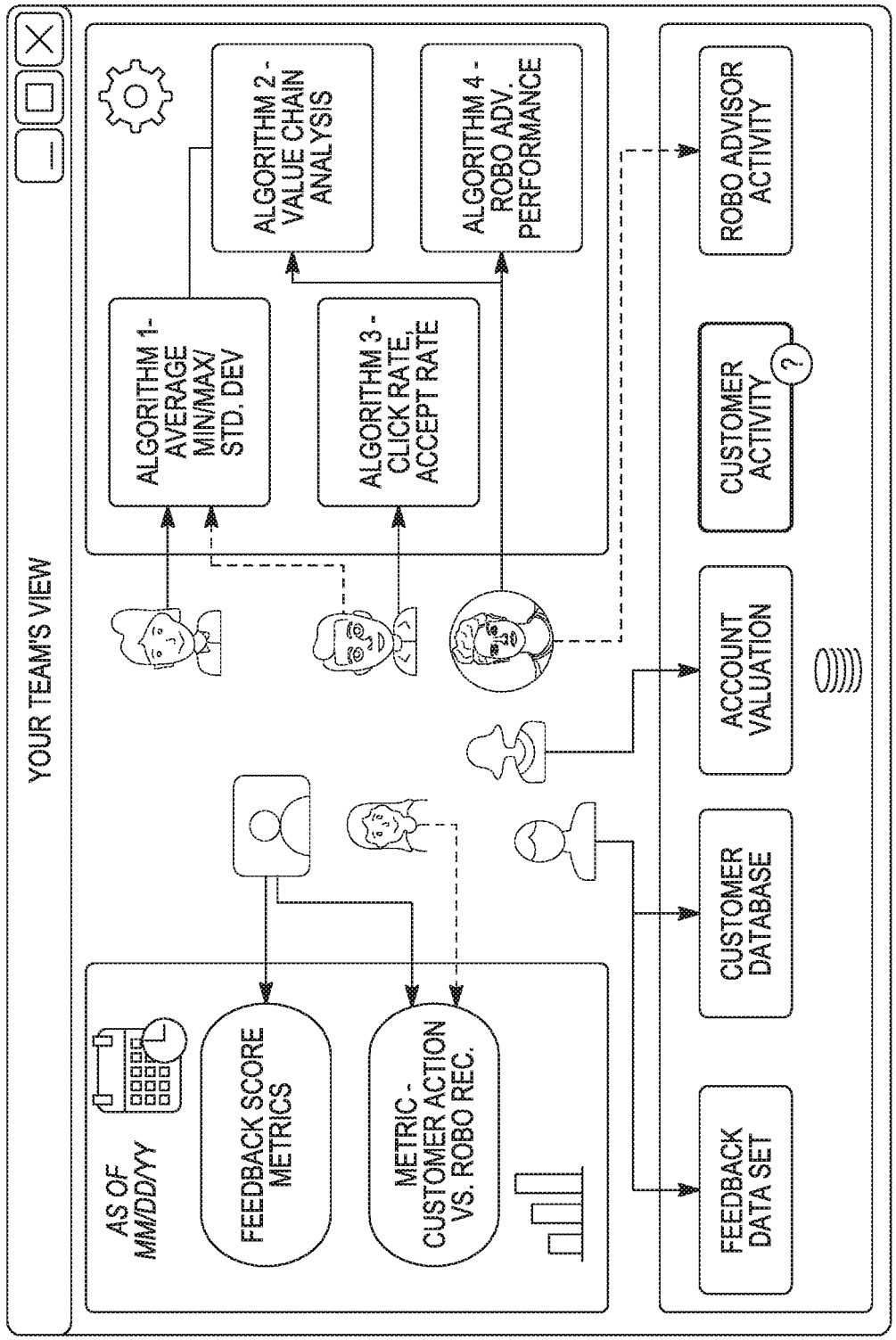
FIG. 12 is a screenshot of an additional example user interface presented by the AI governance platform.

FIGS. 11-12 are screenshots of additional example user interfaces presented by the AI1 platform. These example user interfaces include user interface elements for managing a team having members who authored or contributed or are otherwise associated with a computerized process (e.g., having AI components) that is executing in a computer environment of an organization. A user can select a contributor's avatar to view how certain team members have been contributing to the development or execution of AI algorithms or applications deployed in the computing environment. A user interface element (e.g., a solid arrow connecting a person's icon to an output or algorithm) indicates the person has original authorship, whereas a different user interface element (e.g., a dotted arrow) shows other parties that are also accountable. In this view, an additional user interface element (e.g., question mark enclosed in a red circle) designates any data or analytic for which accountability is missing. In example embodiments, relationships between underlying datasets (e.g., a feedback data set, customer database, account valuation, customer activity, or robo-advisor activity), AI algorithms (e.g., average/min/max/standard deviation algorithms, value chain analysis algorithms, click rate/acceptance rate algorithms, and robo-advisor performance algorithms), and key metrics (e.g., feedback score metrics, and customer action vs. robo-advisor recommended actions) are depicted (e.g., for a particular date or range of dates associated with a replay or simulation of a particular scenario). In this way, a user may interactively drill down into one or more business owners or contributors associated with the execution of one or more AI algorithms that led to a particular output or decision being made (e.g., with respect to a business objective being executed within the computing environment).

Figure 13:
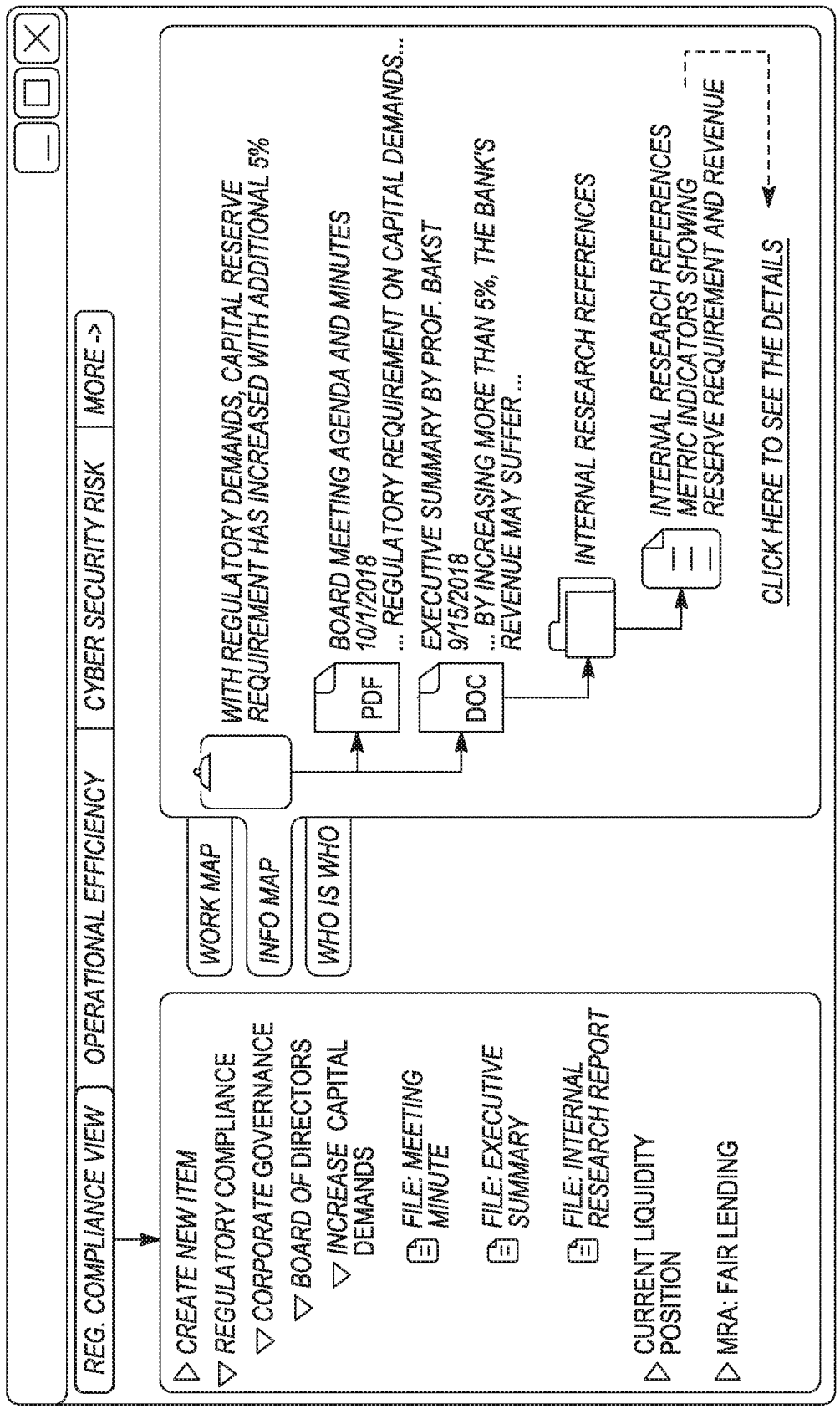
FIG. 13 is a screenshot of an additional example user interface presented by the AI governance platform.

FIG. 13 is a screenshot of an additional example user interface presented by the AI platform. Here a regulatory compliance view is presented. The view is associated with a data set that includes "corporate governance" data. A user may interactively drill down into the data set (e.g., by selecting corresponding user interface elements representing a hierarchy of the data set) to view, for example, very specific data items pertaining to a category of data items in the hierarchy, such meeting minutes, executive summaries, and internal search reports specific to a category of "increase in capital demands." In example embodiments, one or more of these data items may be used as inputs into one more AI algorithms or comprise metadata associated with the development, execution, or monitoring of the AI algorithms executing within an organization. The data set may be accessible in conjunction with other aspects of the user interface to, for example, identify particular elements within deployed AI algorithms that may lead to different calculations of key constraints or different decisions being made by the AT algorithms.

Figure 14:
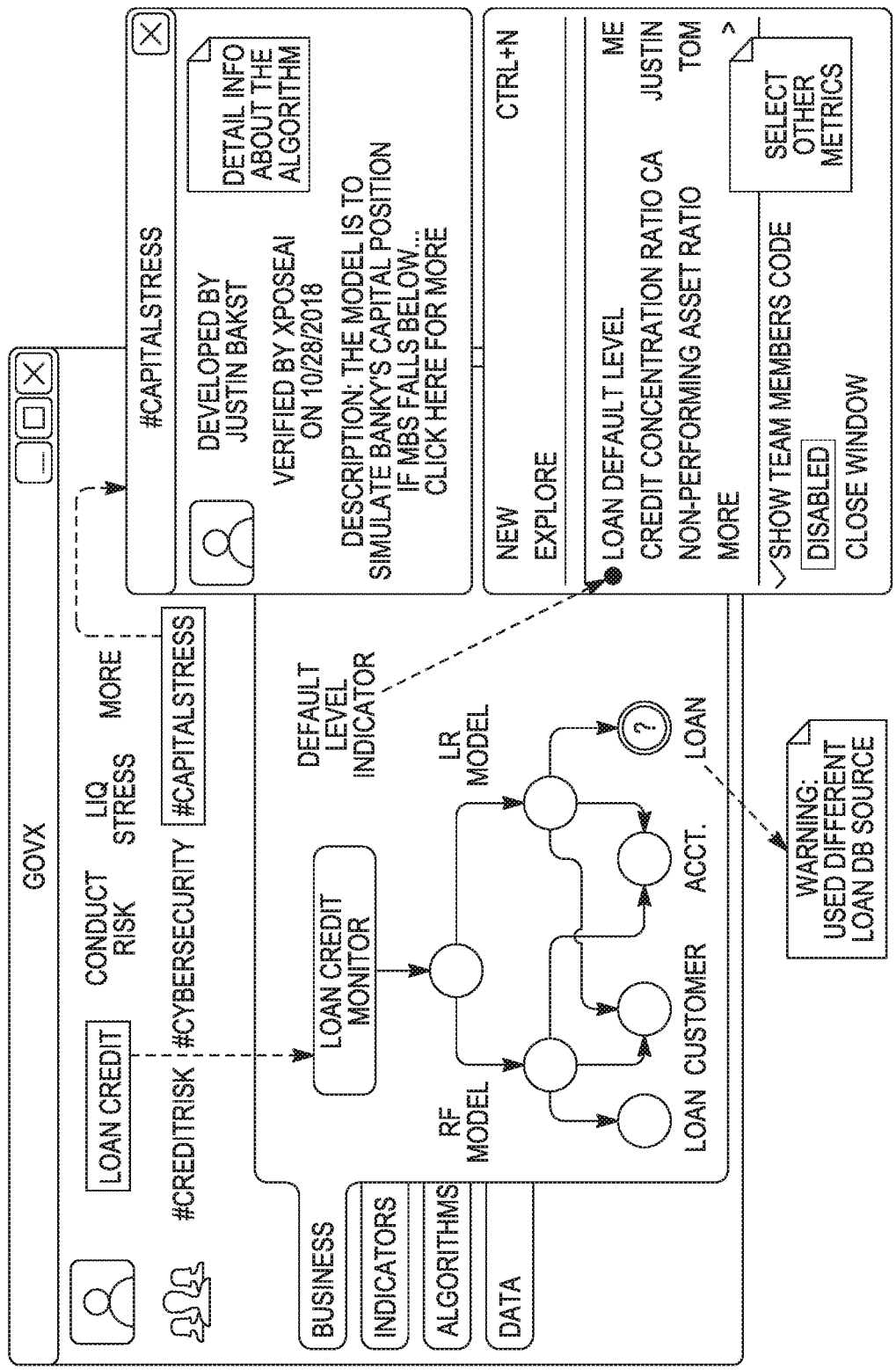
FIG. 14 is a screenshot of an additional example user interface presented by the AI governance platform.

FIG. 14 is a screenshot of an additional example user interface presented by the AT platform. Here, a loan credit monitoring application is presented that provides transparency to the use of the underlying AI algorithms. Various AI algorithms associated with various business objectives (e.g., loan credit/credit risk, conduct risk/cybersecurity, liquidity stress/capital stress, and so on) are selectable within the user interface. Each algorithm is associated with metadata, such as information pertaining to one or more developers of the code, a verification date of the code, and a description of the code. The user interface allows an administrator to drill down from the business objectives layer (e.g., loan credit monitor), key constraints, algorithms, or data sets. Thus, for example, a user may be able to determine the developers responsible for maintaining code used to calculate one or more key constraints (e.g., loan default level, credit concentration ratio CA, non-performing asset ratio) and drill down into the actual code that implements the algorithm. Additionally, the user interface may provide a warning pertaining to an out-of-bounds constraint, such as a warning that a particular key constraint was based on a different loan database source than a different key constraint used in the calculation. By identifying this data source discrepancy, an administrator may be able to pin down a reason for an out-of-bounds result of an execution of the AI algorithm (e.g., over a particular time period).

Figure 15:
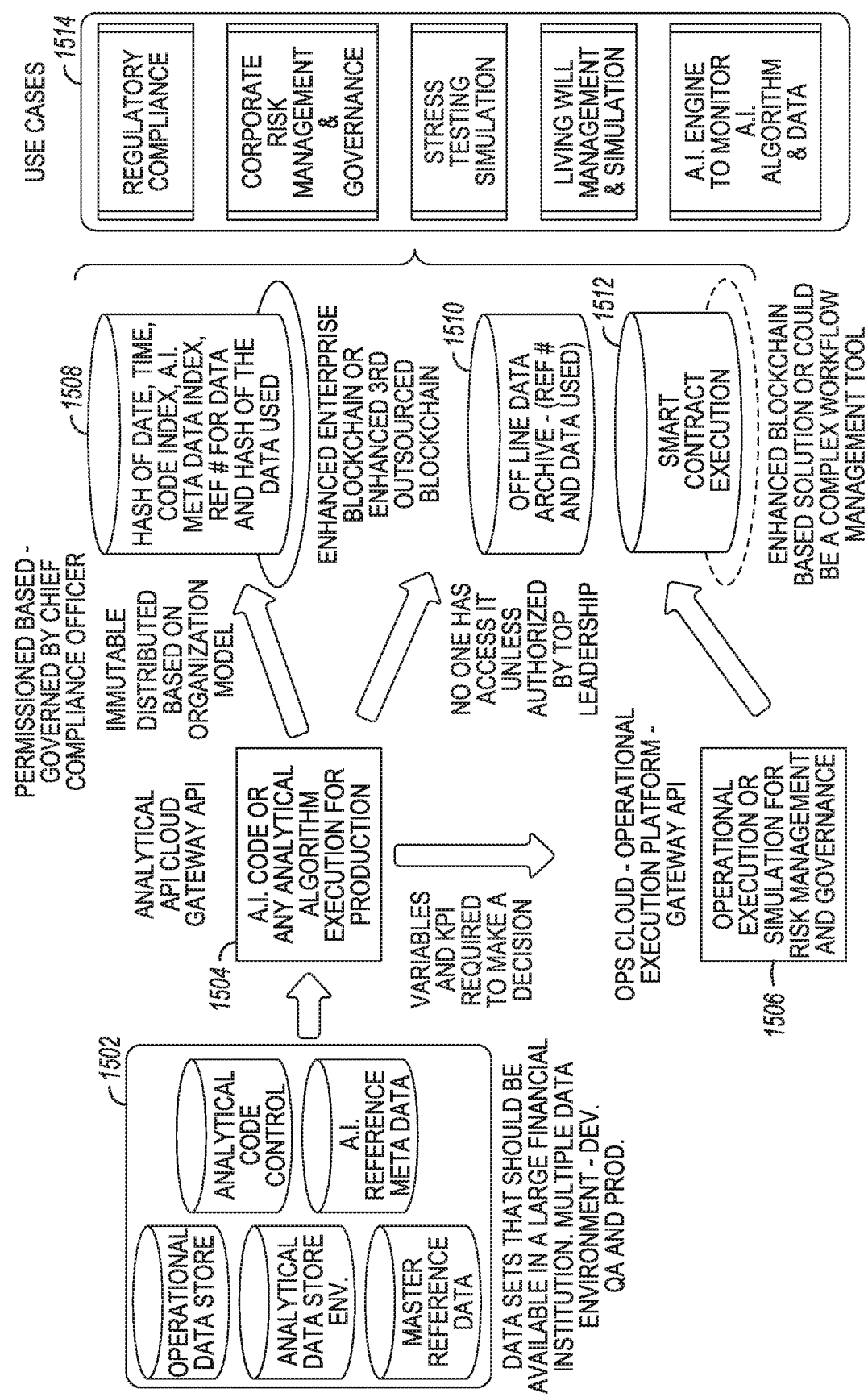
FIG. 15 is a block diagram depicting an example application of the AI governance platform deployment example for various use cases.

FIG. 15 is a block diagram depicting an example application of the AI platform for various use cases.

Use cases for the platform disclosed herein may include complex models (e.g., "inside" analytics and AI), compliance, bots, and anti-money-laundering.

At 150, data sets available to the organization are accessed. At 1504, the data sets are fed into AI code for execution. At 1506, risk management and governance are implemented by the AI platform, as described herein. At 1508, an enhanced enterprise blockchain is generated, as described herein. At 1510, an offline data archive is accessed and, at 1512, use cases 1514 (e.g., smart contracts) are executed (e.g., with respect to the enhanced blockchain) as described below.

Complex Models

Banks may employ thousands of complex models to aid in making strategic decisions. The unintended consequences of using such black box models can in part be protected against with three lines of defense: business unit supervision, compliance, and auditing. Model development, model governance, and model management can help safeguard against potential threats. However, data within financial institutions are set to double every two years into the future. AI, even in its infancy, introduces new, automated business logic through decisions made in real time. The model-management process alone cannot protect against all types of dangers.

Examples of AI or complex modeling that may be deployed or adopted (e.g., by large organizations) may include chatbots that respond to voice commands or robo-advisors that assist consumers with meeting their financial goals. Some example deployments may leverage Insider Threat Prevent, Cybersecurity, or Anti-Money Laundering/Bank Secrecy Act (AML/BSA) technology for more effective transaction monitoring, utilizing sophisticated AI models to drive more efficient decision making in compliance and credit risk management.

The success of such use cases and real-world examples may vary. For example, although sophisticated "models" have been driving an industry for a decade or more, some organizations within the industry may be slow to adopt new technologies or may question the role of AI in their traditional activities. Employment of AI to achieve internal efficiencies may have slowed (e.g., as a result of lack of transparency around data and assumptions). For example, in the banking industry, although investment in advanced modeling services may have grown, only a small percentage of actual banking activity may have been actually affected within "FinTech" services.

Compliance

Banks continue to manage compliance initiatives in a more strategic fashion. Today, compliance teams are proactive and more aligned with business objectives than previously, a clear departure from the reactive nature of post-crisis regulation. This year's strategic focus is management of data and IT capabilities.

Areas of particular interest around compliance include data governance, data quality, and data control. In addition, from a more tactically oriented perspective, analyzing customer complaints, fraud, and other customer-centric activities have become a priority. Automated document management and other data advancements are also being considered. According to industry surveys, banks are slow to realize technology advancement, primarily due to data-quality challenges.

Many organizations are evaluating and implementing advanced modeling such as AI to assist in data management. As these technologies are being introduced, new methods to manage the outputs are also becoming necessary. Smart management and control of key data/model inputs and outputs are the missing link to successful long-term improvements in compliance.

Bots (e.g., Chatbots and Robo-Advisors)

AI bots of various types may very well power the banks of the future. AI bots may have text and voice capabilities to better serve customers and make investment recommendations. Many banks predict that, in the future, the use of bots will be as common in banking as in Google, Alexa, and Siri. Bots may standardize best-practice customer service, as they work 24/7 and never go on vacation. In addition, hots can push relevant content to users based on customer analytics, a capability that is rapidly becoming a valuable sales channel. Robo-advisors, another type of bot, now offer advice on investment decisions. Bots can also provide standardized metrics to leadership teams around product adoption and customer engagement. Bots promise the world, but many find widespread adoption lacking and low ROI on investments in these.

Unfortunately, bots also have the potential to harm banking relationships. Their interpretation of customer questions are often times incorrect; the bots are not yet smart enough to understand most questions accurately. In addition, they are not capable of cultivating a personal relationship with bank customers, thereby possibly damaging valuable banking relationships. All things considered, the greatest risk associated with use of hots concerns trust and transparency around decision-making capabilities.

In particular, the trust issue around bots is extremely concerning to many industry leaders. For instance, Amazon's Alexa and Apple's Siri interpret our words and offer solutions and advice—becoming smarter (i.e., more capable of interpreting and answering questions correctly) the more we interact with them. However, Alexa and Siri are black boxes with no visibility into the data AI gathers and the assumptions and predictions it employs around consumer behavior. This might be acceptable in low-stakes tasks such as listening to music or e-mailing friends, but, in banking and other highly regulated industries, this is a significant concern. Financial products must provide levels of transparency acceptable to all stakeholders. The risks are real, ranging from violations in fair lending issues to fraud. Independent smart management and replay of automated decision making becomes paramount to the success of long-term AI projects.

AML/KYC

Anti-money laundering (AML) has become increasingly more expensive to manage as technological advances have increased the number of cross-border payments and as regulatory oversight has intensified. According to some industry experts, the number of AML compliance staff has been growing significantly. Fragmented data and processes have created high levels of inefficiency in AMT. Unfortunately, much of today's traditional transaction monitoring around AML and KYC has resulted in high levels of false positives, an expensive operational burden for most institutions. AI solutions can leverage the banks' best resources for smart investigation of high-risk transactions. A more robust dataset around customer activity and the ability to refine high-risk situations has created a highly leverageable solution.

However, driven by transparency concerns, full-scale AI adoption in AML/KYC is lagging, although more robust analytic efforts are apparent for smarter evaluation of transactions to reduce false positives. Although these are not full-scale AI models, these advanced analytics demonstrate the power of more robust analytical capabilities.

Figure 16:
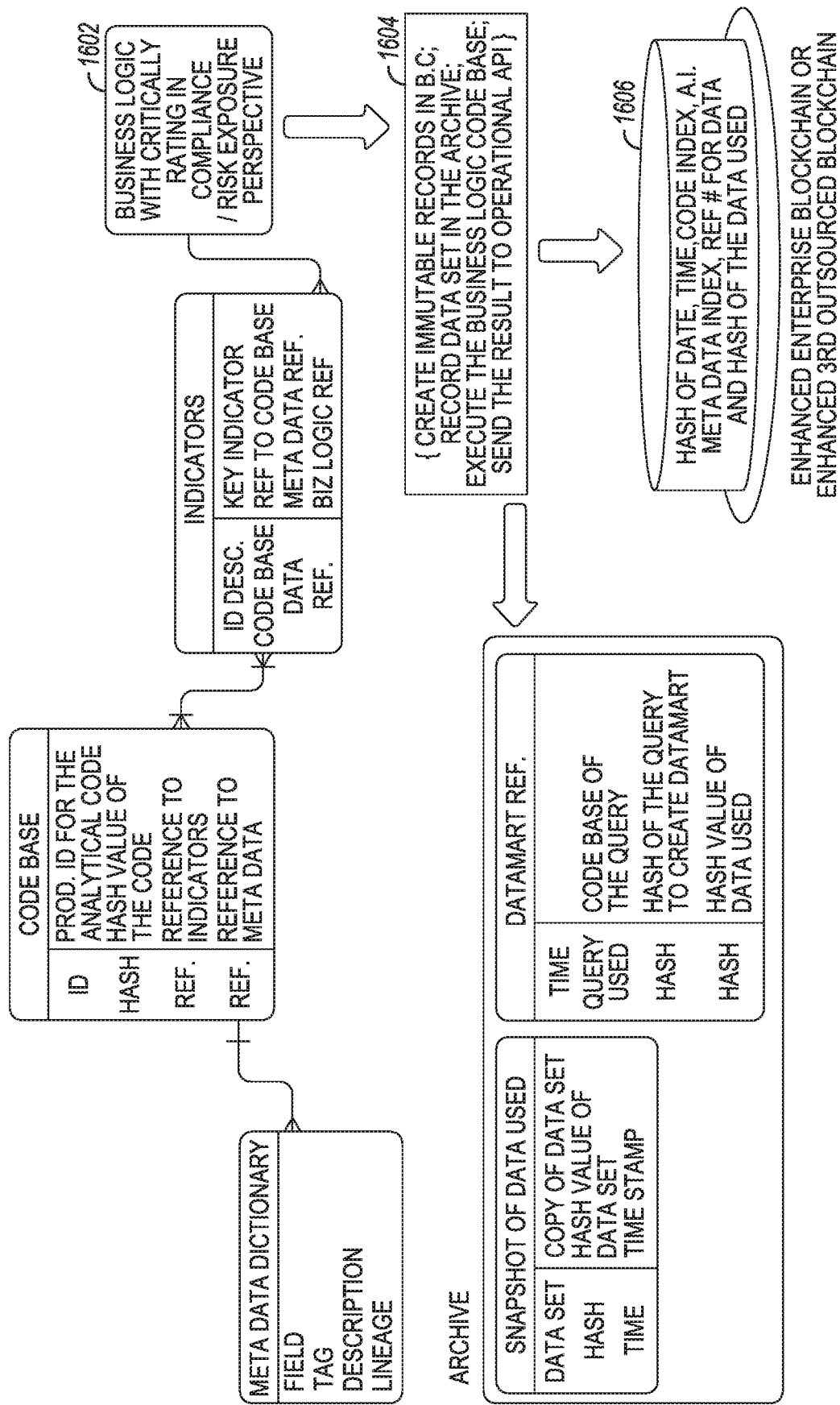
FIG. 16 is a block diagram depicting various data structures used in example applications of the AI platform.

FIG. 16 is a block diagram depicting various data structures used in example applications of the AI platform. At 1602, business logic (e.g., computer processes executing within a computer environment of an enterprise) is executed. At 1604, results of the execution of the business logic are stored as a data set (e.g., immutable records in a blockchain), which includes an enhanced data set (e.g., enhanced blockchain 1606). The results may be generated based on a wrapping of the business logic in special wrappers as described herein. An archive, metadata dictionary, code base, and indicators are generated (e.g., in accordance with the wrappers incorporated into the business logic). The data is fed back into the business logic (e.g., as training data) to, for example, improve the business logic with respect to governance of the business logic, as described herein.

Figure 17:
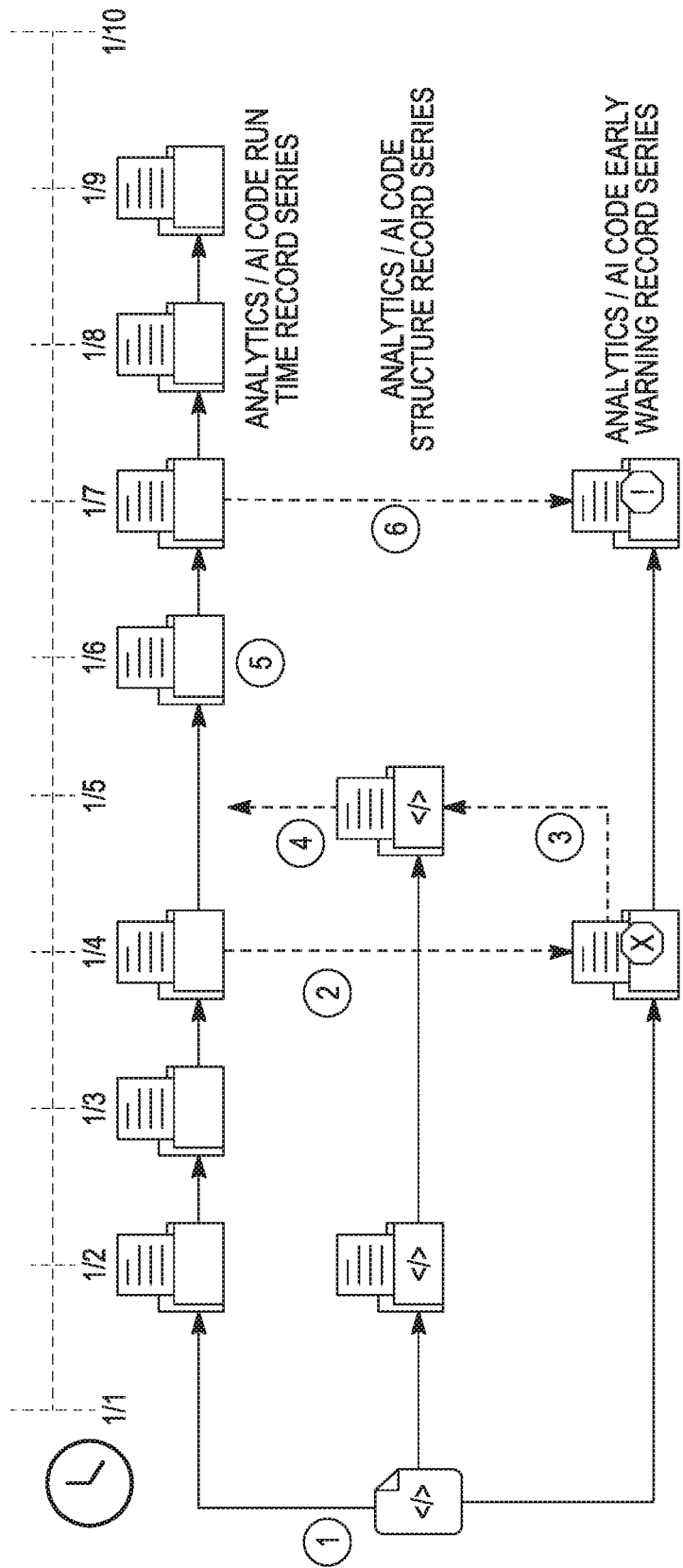
FIG. 17 is a block diagram depicting three time series threads from one analytic or AI code portion, block, or application.

FIG. 17 is a block diagram depicting three time series threads from one analytic or AI code portion, block, or application. At 1, upon submission of new AI code to the AI platform, a genesis block is created, which, in turns, spawns three separate block chains—a real-time (online) execution block chain, a code development (offline) blockchain, and a beacon block chain. At 2, an anomaly or out-of-bounds output value is detected and recorded as a beacon block. At 3, a correction is made to the source code associated with the At algorithm. At 4, the new source code is deployed. At 5, it is determined that the code change fixed the out-of-bounds condition. At 6, a new anomaly is detected and information pertaining to the anomaly is added as a new record to the beacon block chain. Thus, between the three block chains associated with the AI algorithm, each of which includes cross references to the other block chains, a complete record pertaining to governance of the AI algorithm is created and maintained. The information contained in the three block chains can then be surfaced within one or more user interfaces implemented by the AI governance platform.

Figure 6:
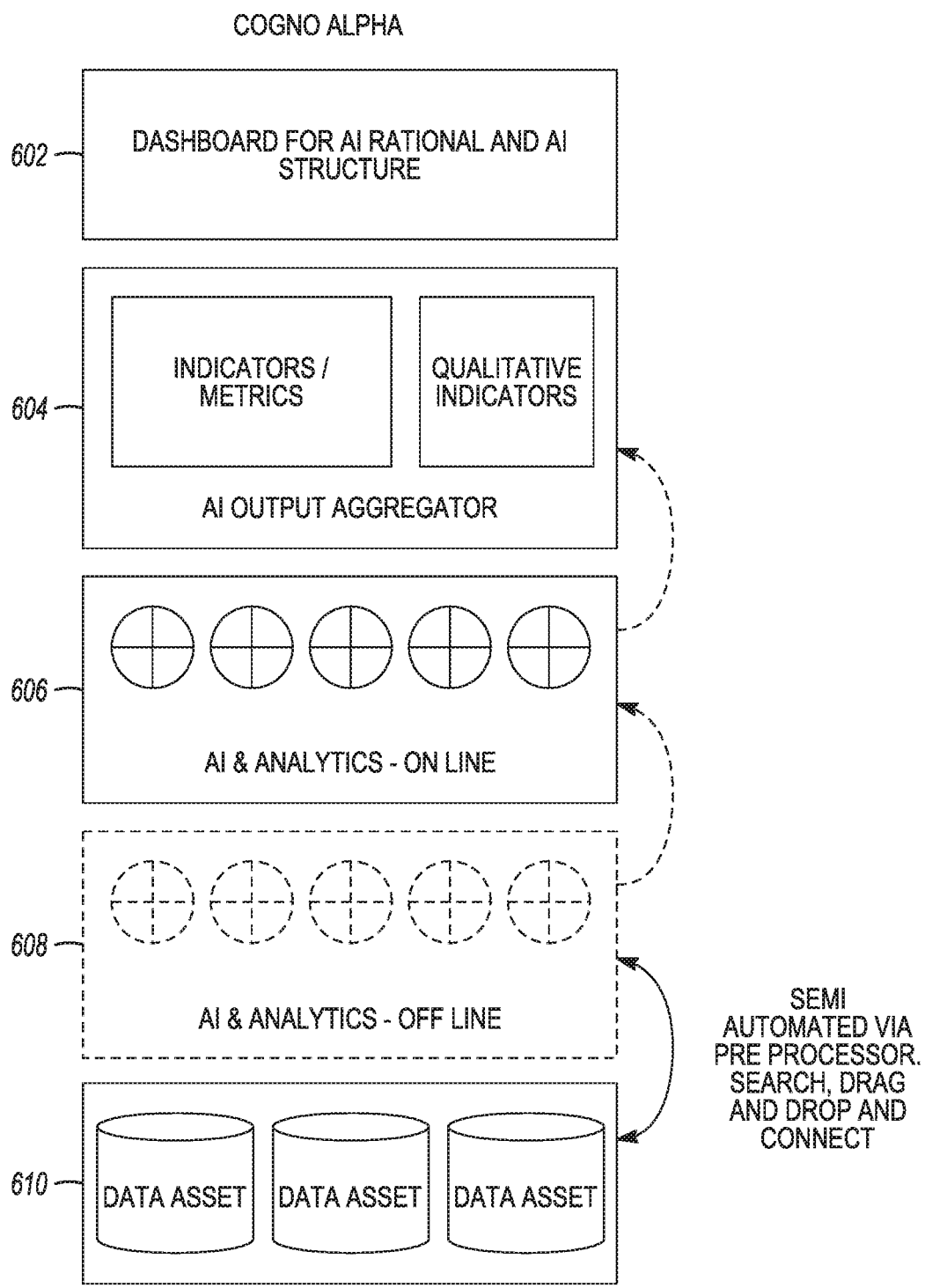
FIG. 6 is a block diagram of a bottom-up approach for deployment of the AI governance platform within an organization.

FIG. 18 is a block diagram depicting a block data structure for an AI record block used by the AI platform. In example embodiments, the data included in the block data structure is generated periodically (e.g., by analyzing or ripping apart) a file containing code of the data asset and identifying or extrapolating the values corresponding to fields in the AI record block, as described above with respect to FIG. 5 and FIG. 6).

In example embodiments, the block data structure includes a field for various factors or features, including variables used by the algorithm to perform machine learning.

In example embodiments, the block data structure includes a field for a decision tree, which captures conditional statements (e.g., as identified by if, then, else, and while statements such as those used to perform classification in the AI algorithm.

In example embodiments, the block data structure includes a field for state, which includes a state machine (e.g., for object-oriented algorithms), as well as its possible values.

In example embodiments, the block structure includes a field for an input block, which may include input variables, neural network agent messages, and so on.

In example embodiments, the block structure includes a field for assumptions, which may be derived from, for example, constants, global variables, and so on defined within the code or related resources.

In example embodiments, the block data structure includes a field for data set used, such as table names, logical sources, field names, and a data set index.

In example embodiments, the block data structure includes a field for a query used (e.g., a database query).

In example embodiments, the block data structure includes a field for data integrity (e.g., a hash value of the data set).

In example embodiments, the block data structure includes a field for output (e.g., including variables containing output data).

In example embodiments, the block data structure includes a field for guard rail, which is an ontology of the data defining allowed output. For example, consider an organization that employs the AI algorithm to perform classifications (e.g., to identify an item within a photo as a cat or dog). The AI algorithm may include decision points (or nodes) by which the classification is made. If an organization cares only about classifications of dogs and cats within a photo, the guard rail is defined (e.g., via the nodes) such that a fish appearing within the photo violates the guard rail (e.g., and thus is ignored). As another example, consider a guard rail for quantifiable data, such as for credit-to-debt ratio. Here, the guard rail may be a range of allowed values, such as only values in the range from 0 to 1.

In example embodiments, the block data structure includes a field for time stamp, which is a date and time when the code executed during the run time or when the code was submitted for offline processing.

In example embodiments, the block data structure includes a field for who contributed to the AI code (e.g., names of developers).

In example embodiments, the block data structure includes a field for comments, which include a description of what the AI code is meant to do.

In example embodiments, a method of generating an alert that an aspect of an AI algorithm has fallen outside of a desired boundary is disclosed. An output of the algorithm or a variable pertaining to a decision point within the AI algorithm is identified. A boundary is associated with the output or variable. During execution of the AI algorithm, a violation of the boundary is detected, triggering the AI algorithm to generate a notification of the violation. The notification of the violation is transmitted to a mothership system. Upon receipt of the notification, an alert is generated and presented in an administrative user interface of the mothership system. The user interface includes one or more dynamic user interface elements for drilling down into the AI algorithm, including key constraints, to identify one or more reasons for the violation. In example embodiments, special code is embedded into the AI algorithm to call a separate AI Beacon process. The AI Beacon then performs the detection of the violation by evaluating the AI code (e.g., by comparing the state of the code (e.g., based on an AI record block) to pre-defined boundaries).

In example embodiments, a method of detecting an anomaly in the execution of AI code within a computerized environment of an organization is disclosed. An AI algorithm is monitored in real-time during run-time execution within the computerized environment. Outputs or values of variables generated at run-time by the AI code are compared against expected outputs or values of the variables predicted by corresponding offline processes. For example, the inputs of the online process are used for playback via one or more offline implementations of the AI code. Any anomaly in output or values of variables are identified. The anomaly is presented in a dynamic user interface that enables the user to drill down into the online and offline versions of the code to understand why different results were generated.

In example embodiments, a method of generating a multi-threaded blockchain for AI governance is disclosed. The multi-threaded blockchain includes separate threads of records corresponding to online behavior, offline behavior, and beacon information. The threads of records refer to each other (e.g., through timestamp or code ID). When AI code is launched, a genesis block is created, which then spawns each of the multiple threads. During online execution, AI blocks are generated in the online thread (e.g., whenever new outputs are generated). At blocks are also generated in the offline thread (e.g., whenever AI code changes). Beacon blocks are also generated for the Beacon thread (e.g., whenever an output or value of a variable goes out of bounds). The three threads are then compared to identify a reason for the out-of-boundary condition. The multiple threads and their relationships are presented in a user interface having navigable elements for drilling down into the AI blocks and Beacon blocks to identify the reasons for the out-of-boundary condition.

In example embodiments, a method of improving blockchain consensus for AI governance is disclosed. A subset of nodes (e.g., one or more nodes) (i.e., instead of all nodes) of multiple nodes of a blockchain are randomly selected for implementing the consensus. Records are then added to the blockchain only by checking AI code lineage. History of record addition activities is logged and the reduced consensus mechanism validates the lineage, thus improving overall system performance. Each blockchain node can do a proactive replay based on actual data used and determine whether there is consensus with respect to the one or more outputs. In example embodiments, any discrepancy (e.g., non-unanimous consensus) may be indicative of anomaly in AI algorithm. In example embodiments, the failure of unanimous consensus is represented in a dynamic user interface that allows a user to identify the reason for the failed consensus.

Smart Contract Monitoring and Auditing

The current smart contract implementations for any blockchain (including bitcoin payment) do not have control mechanisms to ensure the smart contract is in fact set up properly and executed properly. Today, blockchain-based implementations use a probabilistic assessment to ensure the security of the smart contract execution. Lack of finality does not exist in the blockchain and this prevents business process with high stake (e.g., banking or healthcare sector) feel reluctant to use blockchain to replace their current processing system. In short, risk management and control components are mission in the overall the blockchain ecosystem.

Several solutions tried to address risk oversight solutions, but they were not effective because the risk oversight solutions require a centralized view of the data. However, the architecture of blockchain does not have a centralized database to identify and assess risk.

The disclosed AI platform solves these problems in this way: while keeping the securities around the smart contract execution be probabilistic, the AI platform adds a control function to record, monitor, and audit the smart contract execution in real time.

Example Flow

Figure 24A:
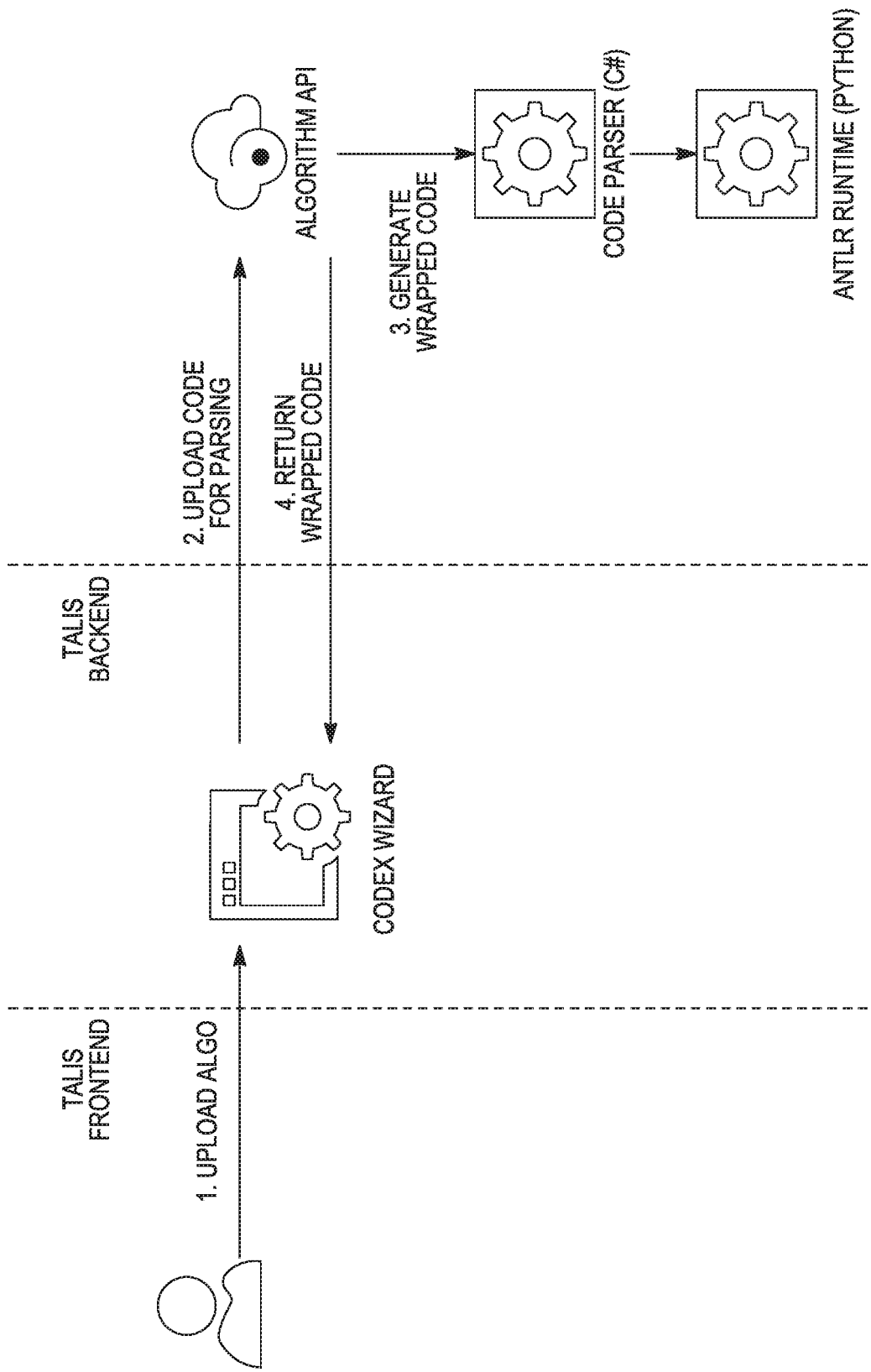
FIGS. 24A-24B are flow charts depicting wrapping and parsing of an Algo and executing the wrapped AI code respectively.

1) A smart contract is submitted to the AI platform prior to being submitted to the blockchain.
2) The smart contract is parsed and read and all functions and state data items are identified (e.g., by the CodeX module).
3) A capture process is implemented (e.g., by the CodeX module). For example, one or more of these things are captured: (a) input to the function and output of the function, (b) state variables, (c) other meta information about the contract will also be captured, such as comment (e.g., description), data set used (e.g., table names, logical source, field names, dataset index), query used (e.g., any database query, code version and code ID), who (e.g., names of people who contributed to the AI code), other comments (e.g., description of what the code is meant to do), or cryptographic token standard field(s) (e.g., ERC20 fields).
4) The smart contract is wrapped with a special (e.g., Talisai) wrapper. The wrapper has a data schema ready to capture the identified data sets with time stamps and communicate them to a message bus. An example of such code wrapping is depicted in FIG. 24A.

Figure 19:
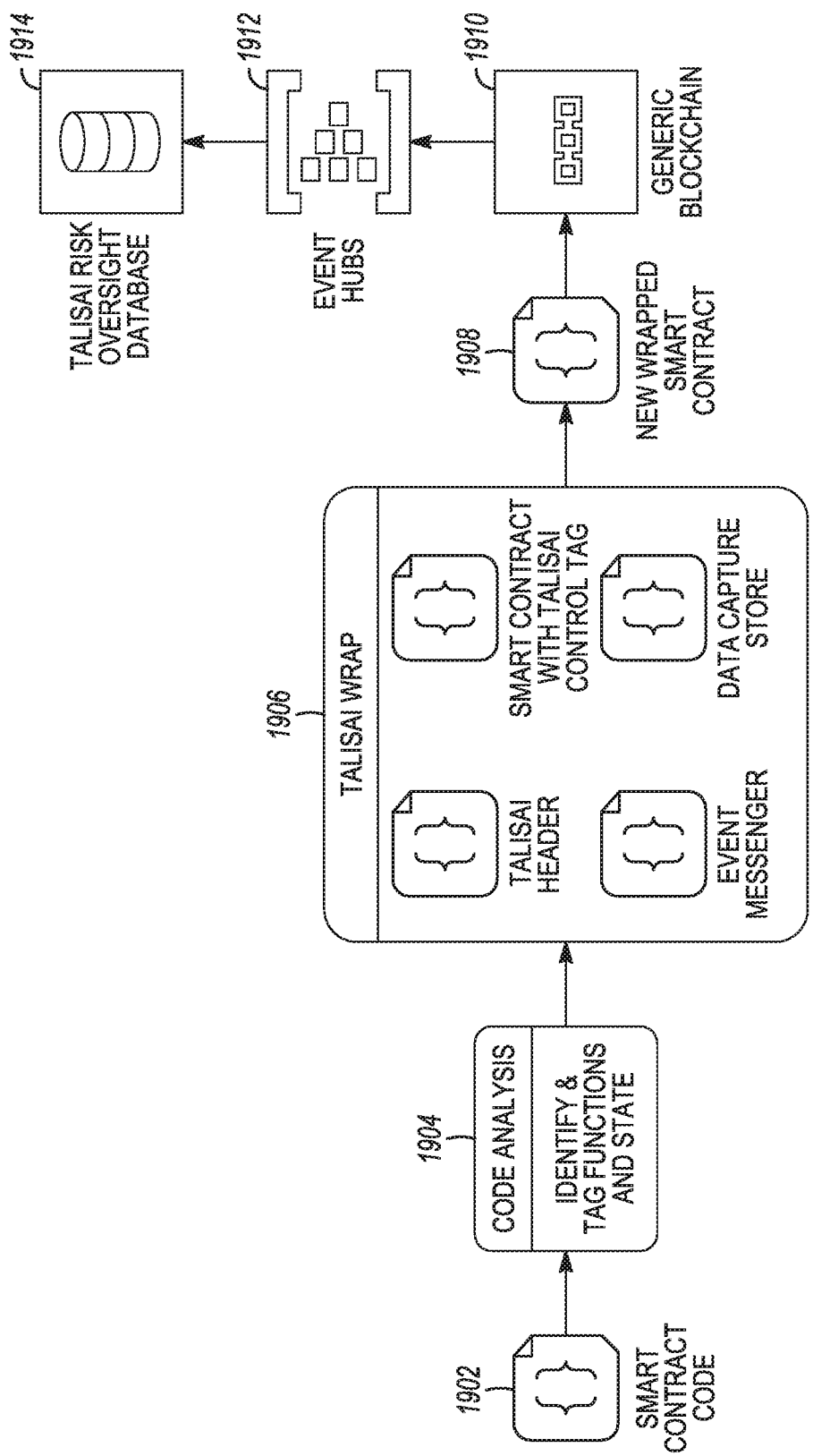
FIG. 19 is an example flow chart of wrapping of smart contract code for inclusion in an oversight database.

FIG. 19 is an example flow chart of wrapping of smart contract code for inclusion in an oversight database. As shown in FIG. 19, this wrapped code can be executed in completely distributed and independent manner. An example of such code wrapping is also shown in FIG. 24A. Wherever the smart contract executable runs in a blockchain (or off-chain), the captured data that must be audited and monitored will be communicated to the AI platform, which subsequently creates its own immutable record blocks that could be referenced.

When a monitored data item within a smart contract (e.g., smart contract function input or output) is outside of error tolerance range, or matches a pattern of business interest, the AI platform issues an alert (e.g., for processing by a business administrator). This is a fully distributed risk control mechanism that could be implemented in any blockchain, as described herein.

At 1902, smart contract code is fetched (e.g., from business logic or computerized processes executing in a computing environment of an organization). At 1904, the AI code is analyzed (e.g., to identify and tag functions and state). At 1906, a special wrapper is applied to the code. In example embodiments, the wrapper includes a header, the smart contract code with a control tag added, an event messenger, and a data capture store. At 1908, the new wrapped smart contract is generated for inclusion in generic blockchain 1910. At 1912, event hubs monitor execution of the wrapped code and provide output pertaining to the execution (e.g., for storage in a risk oversight database 1914).

Payment or Securities Reconciliation Through Multiple Counter Parties

Often times, financial transaction reconciliation involving multiple counter parties end up being either gets cleared late or never sometime cleared. The current processing system (without using blockchain) has effective controls for that.

However, on blockchain, there is no good solution to monitor and explain why certain transactions are not being cleared on time because that the reconciliation is done through distributed "mining" effort, which also is probabilistic.

By using the AI platform solution, controls wrapped in the contract monitors for data that is required to clear the transaction and communicates to the AI platform where the AI platform can proactively monitor transaction reconciliation processes with reasons.

Anti-Money Laundering Involving Crypto Coins

Currently, AML monitoring of crypto coins has either not been addressed or has not been effective. For example, most crypto coins issuance and transaction systems allow people to transfer their coins to different wallets as long as the sender's wallet and its amount is verified. A centralized method of transaction log review does not exist in blockchain-based solutions. Further, a decentralized method of transaction log review simply does not have enough information to analyze for AML.

The AI platform adds log control within transaction mining code that is wrapped (e.g., by the CodeX module). Whenever crypto coin miners attempt to mine to verify the transactions, the transaction information is captured and automatically sent to a centralized AML monitoring database.

Automated Algorithms and Data Governance

As described above, data assets across the modern enterprise are increasing exponentially in terms of volume, velocity, and complexity. While modern data analytics often speak about unlocking the unrealized value in enterprise data, the enterprise is struggling just to keep up with its data assets in a business-as-usual sense for internal reporting, compliance, and regulatory concerns. As machine learning based analysis or complex analytic algorithms (i.e., "Algos") are being introduced and leveraged to tackle the challenges of the data governance and management, today's businesses suffer from lack of automated tools and programs that could efficiently govern and manage relationship among data assets, multiple versions of Algos, and computerized business processes. Some data management and governance tools and programs focus on largely manual metadata management through tools (e.g., Collibra, Infortnatica or through manual data inventory and management processes.

These problems may be solved by, for example, reengineering the Algo to provide transparency to all existing data assets.

Example Steps

Figure 24B:
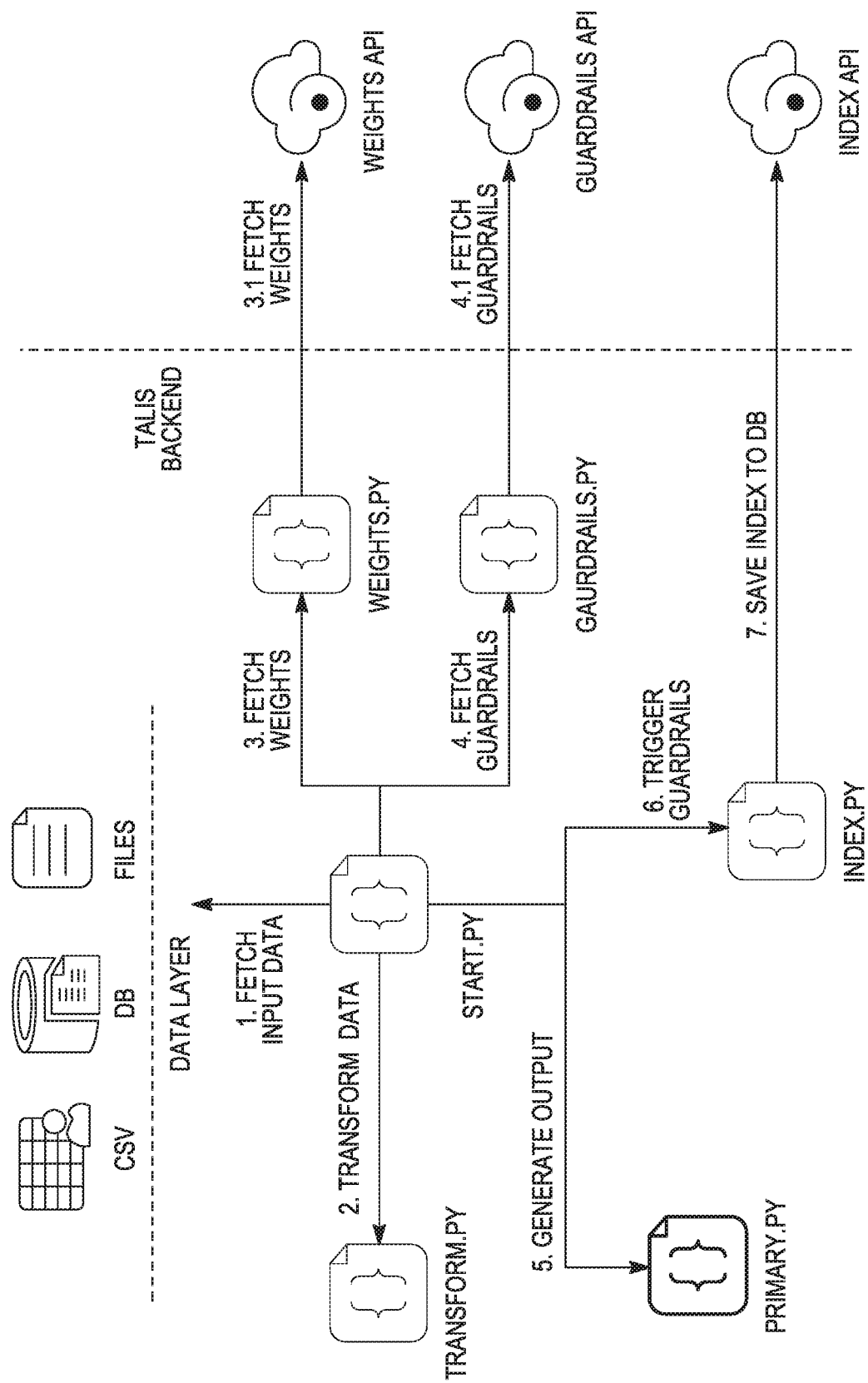

1. An Algo is submitted to the AI platform prior to execution in a computing environment.
2. The Algo is read and parsed and all outputs, functions/methods, data set queries, variables, and assumptions are identified that influence the output of the Algo (e.g., an IndeX is generated by the IndeX module).
3. The IndeX is tagged and captured (e.g., by the CodeX module). FIG. 24B provides an example of such IndeX generation.
4. The Algo is wrapped with a special (e.g., Talisai) wrapper. The wrapper has IndeX schema ready to capture the above data sets with time stamps and communicate them to a message bus. In example embodiments, the wrapper has one or more of the following components: Talisai header; Talisai control data store (namely "Talisai Control Record Block") to capture values of IndeX and other meta data, such as time stamps; Algo ID; Talisai message bus communication protocol; the original Algo. An example of such wrapping is depicted in FIG. 24A.
5. The wrapped Algo is executable independently from the Talisai platform but will communicate to the platform via the message bus. Whenever the Algo executes, a Talisai Control Record Block is sent to the AI platform. An example of such execution of wrapped code is depicted in FIG. 24B.
6. The AI platform receives the Control Record Block and identify lineage information: e.g., What Code ID used which data sets, What Code ID generated which output IndeX (namely Metrics), What Code ID generated IndeX that influenced the output above, Who owns the Code ID, If data sets are registered, register in Talisai automatically, Publish the output IndeX as possible business metrics that business users can use.
7. When business line creates a task (e.g., associated with a computerized process) that requires business metrics, the user can browse available output IndeX from step #6 and associate the Metrics to the task in order to use. The AI platform records the lineage associated by the users between the business task and the Metrics.

With Step #6, automated data and model management have been accomplished. With Step #7, the platform creates the usage lineage by linking Metrics and a human-created business task (e.g., a computerized process)

Layers of Abstractions Within Information Lineage

With the lineage information that is automatically captured, the AI platform has clear information necessary regarding how data assets are used and produced by tracking execution of which Algo, then subsequently how IndeX or Metrics are used by which business task.

Lineage information is so complex that human cannot understand or want to understand. A layers of abstractions is necessary so that business users can easily understand the rationales behind a business decision driven by Metrics, IndeX, Algo and dataset.

Figure 20:
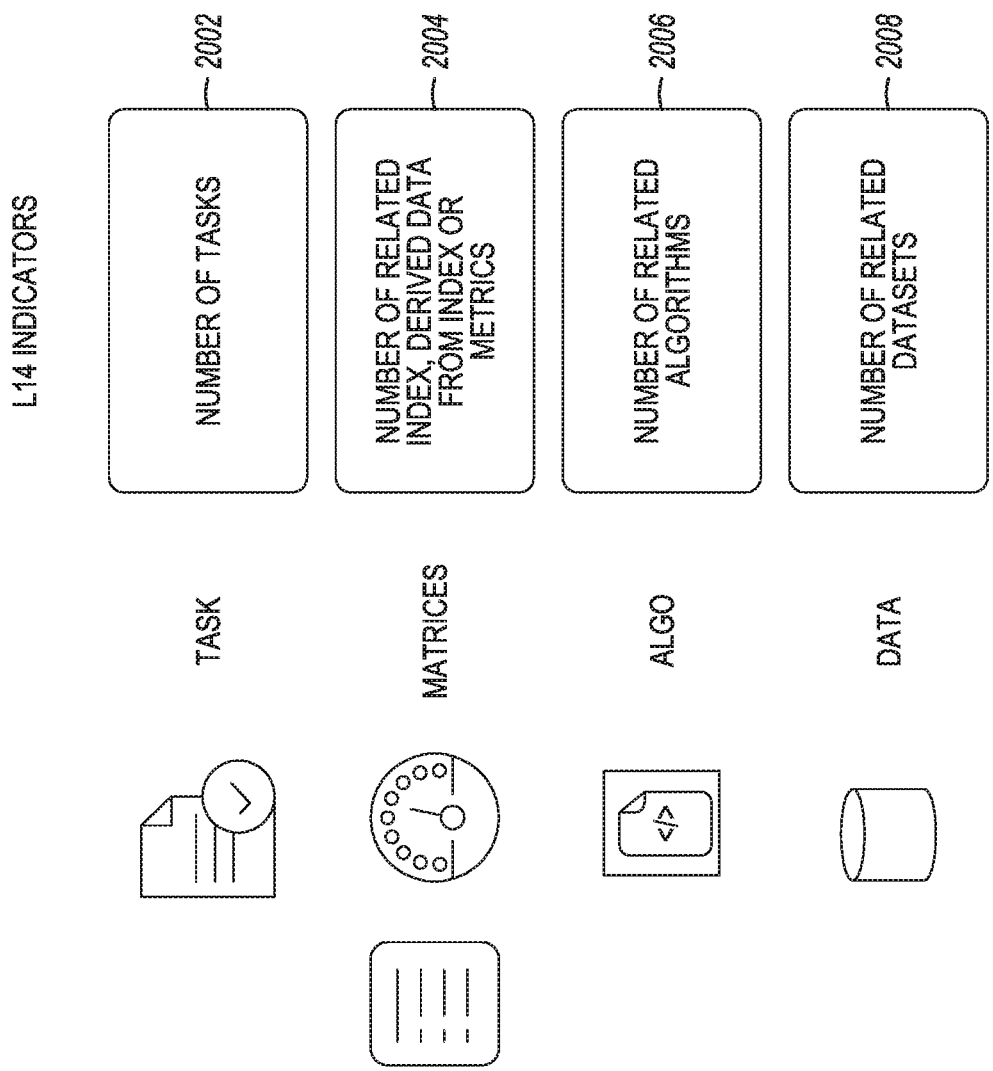
FIG. 20 is a chart showing a correspondence between visual elements (e.g., for inclusion as dynamic, selectable elements within a dashboard user interface) and the information of which they are indicative

FIG. 20 is a chart showing a correspondence between visual elements (e.g., for inclusion as dynamic, selectable elements within a dashboard user interface) and the information of which they are indicative.

In example embodiments, as depicted in FIG. 20, the AI platform uses a "Link Indicator" that groups the lineage information into 4 groups. (named "LI4").

In example embodiments, the LI4 indicators include a number of tasks 2002 (e.g., associated with a computerized business process), a number of related metrics 2004, a number of related algorithms 2006, and a number of related data sets 2008.

Figure 21:
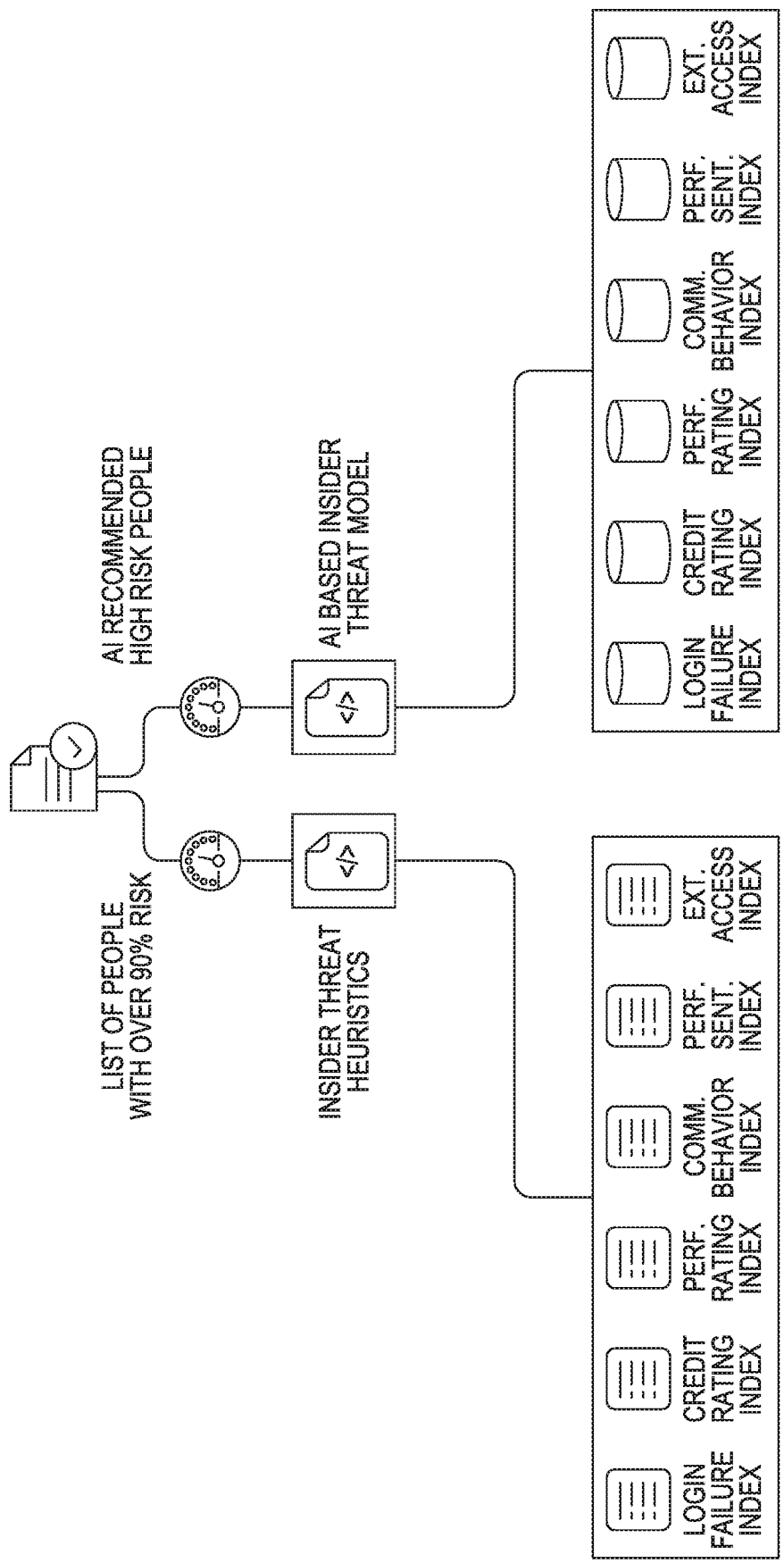
FIG. 21 is a chart showing how the link indicators may be used to drill-down within an information abstraction using a dashboard user interface.

FIG. 21 is a chart showing how the link indicators may be used to drill-down within an information abstraction using a dashboard user interface. For example, as depicted in FIG. 21, four layers of indication may be abstracted from complex lineage information, describing how information is related. In this case, if the task on top is picked, LI4 will show |x|2|2|12| (x being the reference point or current location into which the user has drilled-down into the assets), meaning the task is supported by two metrics, which are supported by two Algos, which were supported by 12 data sets. By selecting a different reference asset a user will see a different LI4 dynamically. For example, if a user selects the "login failure log" dataset, the LI4 will show 1|1|1|x|, meaning the data supports one Algo, one Metric, and one Task.

In example embodiments, a visual representation of the LI4 includes information about a number of assets (e.g., tasks, metrics, algorithms, or data sources) above and below the user's current selected location within the hierarchy as well as a navigable means of moving up or down within the hierarchy. For example, each element represented in the 114 may be a selectable user interface element included on a dashboard user interface that is configured to allow the user to choose a new location within the hierarchy.

Real-Time Monitoring and Alerting.

With a Talisai Control Record Block, the AI platform can set a rule that can monitor and trigger an alert, when any value within the Control Record Block matches or goes outside of error tolerance. This enables early detection when Algo or data are incorrect or (or correct but being biased). This prevents the Algos and Data from influencing a business decision inappropriately.

Insider Threat Prevention and People Risk Management

The goal of Cybersecurity analytics and AI should be prevention. To date, industry priority has been to detect, prioritize, and respond to relevant Cybersecurity events and help prioritize security analyst's time and resources. Organizations need to develop intelligent algorithms to evaluate these complex security events as they happen to prevent damage from happening.

Despite multi-layered security frameworks, the inherent "trust" bias around Insider Threat leads to ineffective detection and significant impact when unmitigated. Modern Cybersecurity increasingly focuses on the management of insider threats (human-borne threats) and the detection of abnormality in business practices, specifically computer-automated practices. But when an organization detects and contains a Cybersecurity incident, it is often too late— critical data has already been breached and exposed. Recent innovation solutions started leveraging machine-learning based algorithms to monitor users' behavior (aka UBA). However, it fails to be effective due to its blackbox in nature. The blackbox model of UBA does not explain the rationales behind the results. And it lacks context around the people's behavior that are different for each person.

To solve this problem, the AI platform gets context around the users' behavior and the business. Instead of focusing on certain users' behavior, our solution is to establish a Risk Context ("Risk Context") around every user that could be different from other people or business. The Risk Context for each of the users is established by 6 key holistic factors (e.g., Sub-Contexts). They are access behavior, communication behavior, financial status, performance, sentiments, external device access. Unlike other solutions, the AI platform may derive up to six core sub-contexts based on changes in behaviors, not based on a specific attributes or threshold in each behavior. Then the AI platform may aggregate them to a consolidated context by using both deterministic Algo and Machine-Learning based Algo. Examples include the following data sources and logic.

Sub-context 1: Access behavior. Ex: Consecutive log-in or access on critical system or physical access. Example data sources: (1) User ID, Date and time, (2) Access failure or success status, (3) Name of the application system or location of physical access, (4) Criticality rating of the targeted asset. Example logic: (1) look for User IDs that have X consecutive access failures or successes in a day against critical system rating Y, (2) Compare the access attempt number of the user to the user's previous attempts (e.g., previous maximum access failure, previous average access failure, etc.), (3) Compare the access failure/success/attempt with HR's data on the user's work schedule. Note—With this logic, the AI platforms looks at changes in the users' access behavior to derive a context for each user.

Sub context 2: Communication behavior. Ex: E-mail or chat pattern information. In example embodiments, the AI platform does not look at the e-mail or chat contents, but does look at header and meta information to develop a context around the users' communication behavior, such as a number of people the person communicates with internally and externally. The AI platform may look at the changes in those numbers to establish this sub-context. Example data sources: (1) E-mail headers, including data/time, from and to address. Example logic: (1) Determine number of internal people, to whom the user (from: address) has been sending e-mail per day, (2) Determine number of external people, to whom the user (from: address) has been sending e-mail per day, (3) Generate a trend/pattern per week for i), (4) Generate a trend/pattern per week for ii), (5) If there was downward trend for iii) and upward trend for iv), capture user IDs.

Sub context 3: Financial status, (e.g., Credit Score information) A person with bad credit score may be assumed to be vulnerable. This assumption, even if true in general sense, may generate a lot of false positives to set up the context. Example data sources: Credit score information for each employee, including (1) Name, User ID, (2) Credit score captured per month. Example logic: Get User IDs corresponding to (1) Any credit score that drops by XX points compared to the last month, or (2) Any credit score that increased by YY points compared to the last month.

Sub context 4: Performance. Ex: Performance rating. One of indicators to gauge employees'/contractors' satisfaction level is to monitor their performance. In example embodiments, to better gauge the job satisfaction sub-context, the AI platform monitors changes in the performance rating, not the rating itself. For example: (1) Someone whose performance rating is below-average all the time, it is less accurate to say that the person is unhappy and vulnerable or (2) Someone whose performance rating drop from the best performance to average performance, it is more accurate to say that person could be unhappy and vulnerable. Example data sources: Performance review results, including (1) Name, User III), (2) a latest number (e.g., four) of performance review ratings. Example Logic: Get User IDs for which (1) The latest performance review rating is below (e.g., 3 on a scale of 1 to 5, with 1 being very poor, and 5 being excellent), or (2) A drop in performance review rating (e.g., a negative difference between the latest one and the one before).

Sub context 5: External device access. Ex: Number of external device access. When an employee/contractor has an intent to steal confidential data, the person may modify their device-usage behavior (e.g., try to avoid on-line attempts) to obtain and steal the confidential data. In example embodiments, the AI platform sets up a context around external device access such as printer or USB device (e.g., to be off-line) as a way to assess the person's risk. In example embodiments, it is not about volumes of print jobs, but rather changes in the usage of the printer or external USB devices that are monitored and evaluated. Example data sources: (1) Number of print jobs per day, (2) Number of external USB accesses. Example logic: (1) Detection that a number of print jobs per day has increased more than XX % from the last month average, or (2) detection that a number of external USB access per day has increased more than XX % from the last month average.

Sub context 6: Sentiments. Ex: Sentiment from communication in both internal and external. In example embodiments, the AI platform uses AI-based sentiment analysis with one or more of the various sub-contexts discussed herein. Example data sources: (1) Sentiment from the overall feedback from manager, (2) Sentiment from the users' response back to the feedback, (3) Sentiment from external social media. Example logic: The AI platform applies one or more AI-based sentiment analysis models to one or more of the sub-contexts discussed herein to determine sentiments or emotions of users or customers with respect to the one or more sub-contexts.

Overall Creation of Risk Context for Each User

In example embodiments, a unique and innovative solution of the AI platform is to have two sets of Algos. (1) Deterministic Algos (namely Algo-D) (e.g., developed by Subject Matter Experts (SMEs) and (2) Machine learning based Algos (namely Algo-1). Both sets may use the same datasets being updated in real time as the business runs.

In example embodiments, Algo-D applies weight to each of the above 6 sub context. Depending on nature of business or corporate culture, some sub context may be weighted more heavily than others.

In example embodiments, Algo-AI applies machine learning models to the same set of data that was consumed by Algo-D. The models may include random forest models, decision tree models, and so on).

With Algo-D and Algo-AI combined, the AI platform may compute a probabilistic assessment (Not a categorization method, like many other machine learning algorithms do) of risk level for each person in the company. Higher risk level is a high probabilistic assessment of a person who could be potentially risky to the company's business. Examples of kinds of impact caused by the risk include potentially stealing of corporate assets, being negligent, or being vulnerable to other bad actors.

Combining Risk Contexts from A log-D and Algo AI

Most of the machine learning based AI requires training. The challenges have been lack of training data, and often times being outdated quickly. AI that does not require initial training data (i.e. unsupervised learning) takes time with human interaction to be trained. In high-stakes business environments, with lack of explain-ability and lack of confidence in the training of the AI, business users do not rely on recommendations or decisions from AI based Algo.

The AI platform uniquely and innovatively addresses this challenge by having three operational modes. (The Final Probabilistic Risk Assessment (FPRA)=f. of (Rating from Algo-D, Rating from Algo-AI, Operational mode, Confidence booster actor).)

Auto base line mode. The FPRA is output from the Algo-D and Algo-D output trumps over Algo AI, the output is automatically fed to Algo-AI to train.

Supervisory mode. The FPRA is output from Algo-D but it also compares the probabilistic assessment rating to the one from Algo-AI. The difference (Delta) is computed for each person and compared against Delta threshold, which is a tolerated error range, that user sets. Group 1: List of people with rating where the delta is nearly none. For FPRA, the AI platforms puts more weights on the rating by multiplying by a confidence factor (i.e., Rating*1.3, where 0.3 is the confidence boost factor). Group 2: List of people with rating where the delta is greater than the delta threshold. For the Group 2, users can investigate this further will fully explainable rationales generated (e.g., by the "Automated Algo and Data governance" solution of the AI platform), then choose which risk rating choose. The user's follow up action will be used to train Algo-AI. Group 3: List of people with rating where the delta is less than delta threshold.

AI preferred mode: The FPRA is output from Algo-AI, but the AI platform also compares the probabilistic assessment rating to the one from Algo-D. The difference (Delta) is computed for each person and compared against Delta threshold, which is a tolerated error range, that a user or administrator sets. The AI platform compares the risk rating from PAPR-D. The delta is computed. PAPR-C displays the output in two groups separated by the delta threshold. Group 1: List of people with rating where the delta is nearly none. For FPRA, the AI platform may put more weights on the rating by multiplying confidence factor. (i.e., Rating*1.3, where 0.3 is the confidence boost factor). Group 2: List of people with rating where the delta is greater than the delta threshold. For the Group 2, users can investigate this further with fully explainable rationales (e.g., generated by "Automated Algo and Data governance" solution of the AI platform), then confirm whether the risk rating from Algo-AI was correct. The user's follow up action will train Algo-AI. Group 3: List of people with rating where the delta is less than the delta threshold.

Throughout the above operations, the AI platform performs a probabilistic assessment of risk for each person by establishing behavioral context for each person dynamically. The assessments may be based on, linked, or otherwise associated with evidence chain management through the real time informational lineage, as depicted in FIG. 22.

Figure 22A:
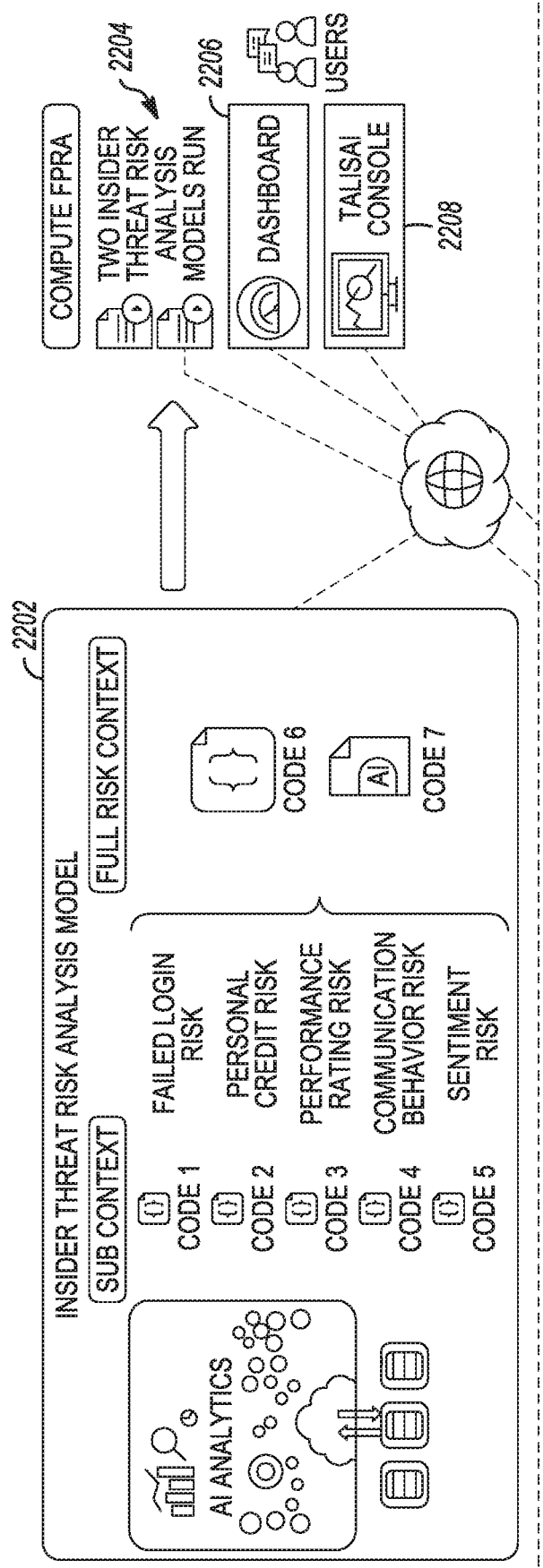
FIGS. 22A and 22B are diagrams of an example architecture of the AI platform.
Figure 22B:
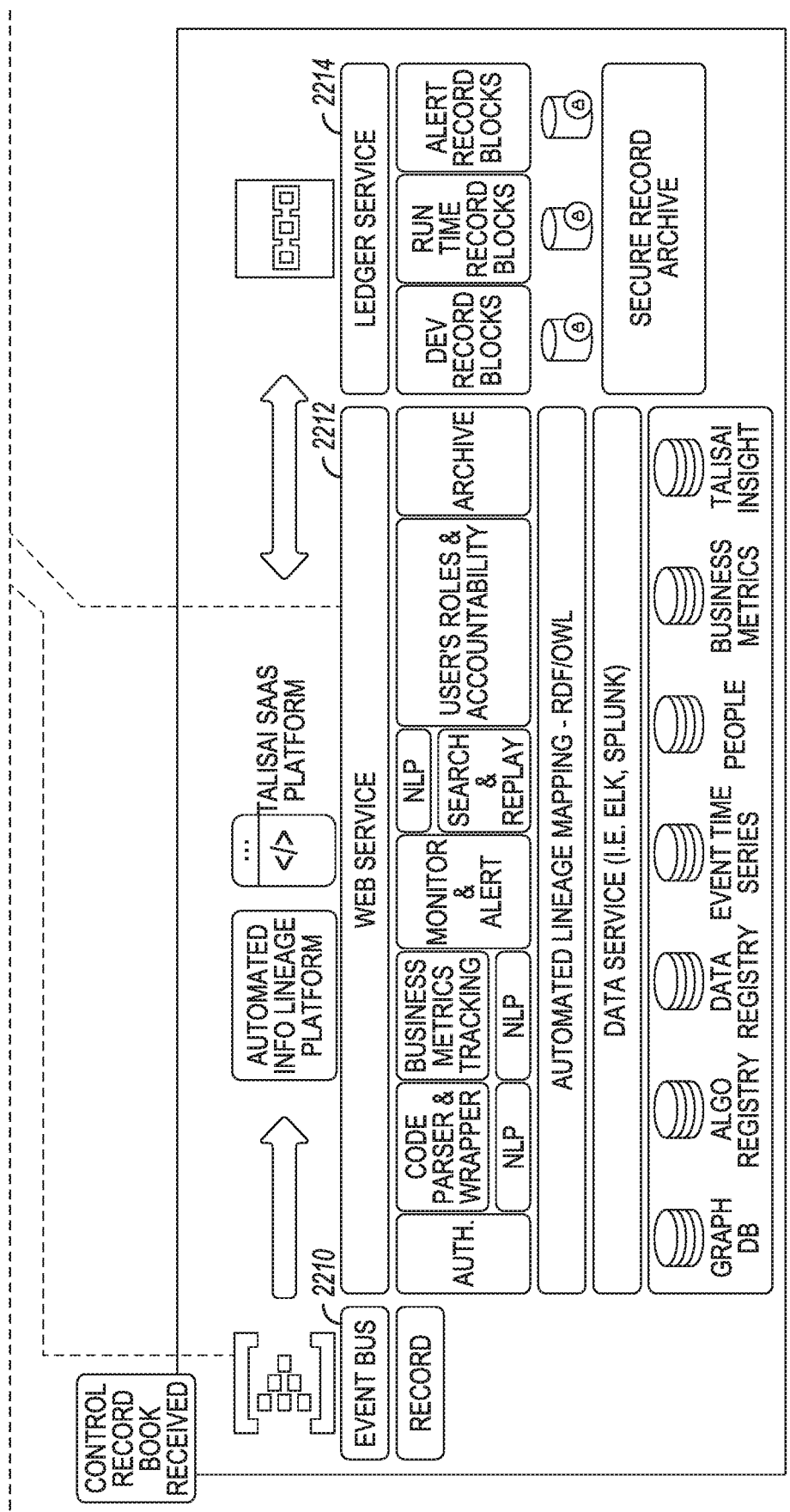

FIGS. 22A and 22B are diagrams of an example architecture of the AI platform. In example embodiments, the AI platform includes a web service 2212 that is configured to implement one or more of the operations or functions described herein. The web service may include one or more data services, an automated lineage mapping service, and various applications or modules for implementing specific functions. The AI platform may include an event bus 2210 that is configured to monitor and evaluate events pertaining to Algos executing on one or more servers (e.g., within a business environment). An example algorithm is an insider threat risk analysis model 2202, which may include one or more pieces of code associated with performing the task of assessing insider threat risks. Users of the AI platform are presented with various user interfaces (e.g., on client devices of the users), such as dashboard 2206 and console 2208 user interfaces, which present results of execution of the models as well as governance information pertaining to the execution of the models 2204, as described herein.

Machine Learning with Context

One difference between machine learning algorithms and human learning a is that a human can understand context and reevaluate certain outcomes within the context. The AI platform addresses how a machine learning enabled algorithm (Algo-AI) can be reengineered or rearchitected to have context in learning. This approach is successfully demonstrated in, for example, the novel solutions discussed above, such as with respect to Insider Threat Prevention & People Risk Management.

Traditional machine learning (MI) is based on identifying "Features" and map the values or existence of "features" to a human defined category (named "Classification"). This architecture is foundational basis of most of the supervised and some unsupervised machine learning models.

The approach of the AI platform is not connecting Features to Classification or certain trends through a mathematical function (e.g., regression or classification). In other words, the AI platform approach of machine learning is Probabilistic Assessment (PA), not classification that drives binary results or certain trends through regression. In example embodiments, the AI platform's features are not characteristic attributes defining a certain category, but rather multiple layers of context relevant to a use case (e.g., business context; behavior context, sentiment context, etc.) that becomes input to PA. In order for this approach to work efficiently and effectively, dynamic and real-time informational lineage is used so that PA can be explained. This is done through the automated model and data governance innovations disclosed herein.

Context and Sub-Context to Train the ML, Not the Features Themselves

In example embodiments, the AI platform defines a context to be assessment of probability. For example, in the Insider Threat Prevention use case, the context may be potential risk rating for each person. The context may be a function of multiple sub-contexts, weights for each context or sub-context, and model governance.

In example embodiments, each sub-context is generated by its own independent Algo with or without machine learning. In example embodiments, the sub-context is computed NOT by data points (e.g., at a certain time), but rather changes in values of those data points (e.g., over selected time period). Depending on the use case, the time period can range from seconds to days/weeks/months.

The AI platform monitors changes of the data points to determine the sub-context that will roll up to overall multiple layers of context abstraction that are meaningful to the business case. (e.g., see the Insider Threat Prevention use case).

In the AI platform solution, machine learning models are learning from a context that is generated by the features, not the features themselves, from the data. Then the outputs from sub-contexts are consumed by multiple Algos, which can add variable weights to each of the sub-contexts, depending on the model itself. Outputs of these Algos are a combined context. An aAlgo model governance module may also assign a confidence booster weight based on the maturity of the model.

Figure 23A:
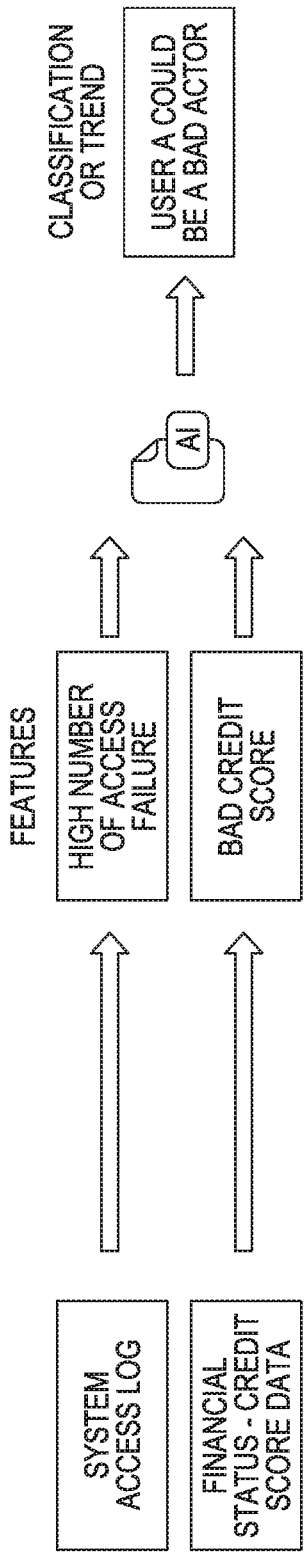
FIGS. 23A-23C are flow charts depicting various AI solutions (e.g., pertaining to generating metrics associated with one or more tasks).

FIG. 23A is a flow chart depicting a basic AI solution. Features (e.g., number of access failures, credit scores) are generated from data sources (e.g., system access log, financial status data). The features are used as input for an AI (e.g., to train a model). The AI is applied to perform a classification (e.g., "user A could be a bad actor.") or identify a trend. Such a basic AI solution may not generate any context around the data points.

Figure 23B:
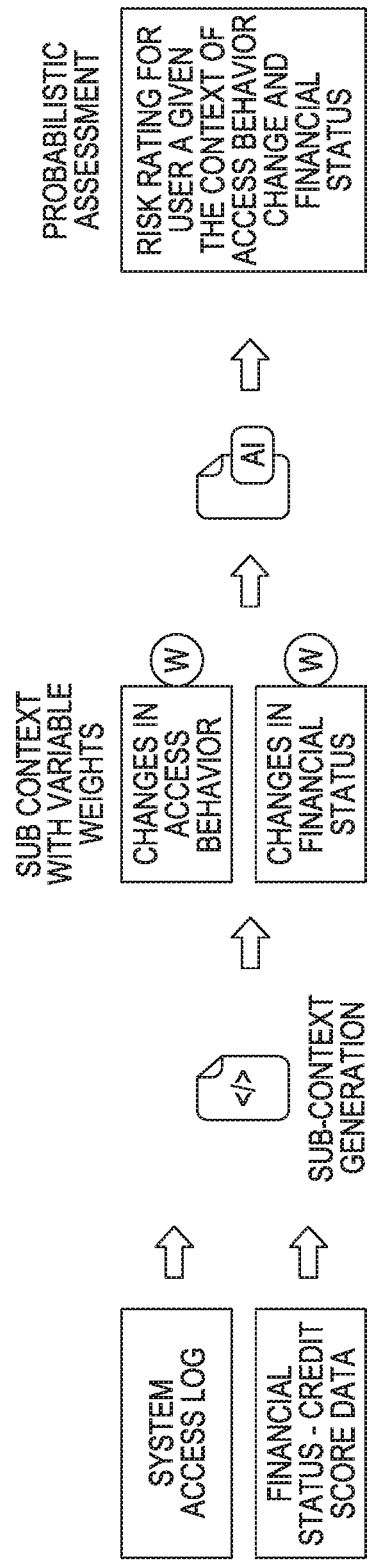

FIG. 23B is a flow chart depicting a simple view of an AI solution of the AI platform (e.g., also referred to herein as Talisai's solution One or more sub-contexts (e.g., changes in access behavior, changes in financial status) are generated from one or more data sources (e.g., system access logs, financial status data). Each sub-context may be assigned a variable weight. The sub-contexts and weights are used as input for an AI (e.g., to train a model). The AI is applied to generate a probabilistic assessment (e.g., a risk rating for a user A given the context of changes in access behavior or changes in financial status). In example embodiments, the result is not a classification or a trend (e.g., such as what may be produced with a basic AI solution).

Figure 23C:
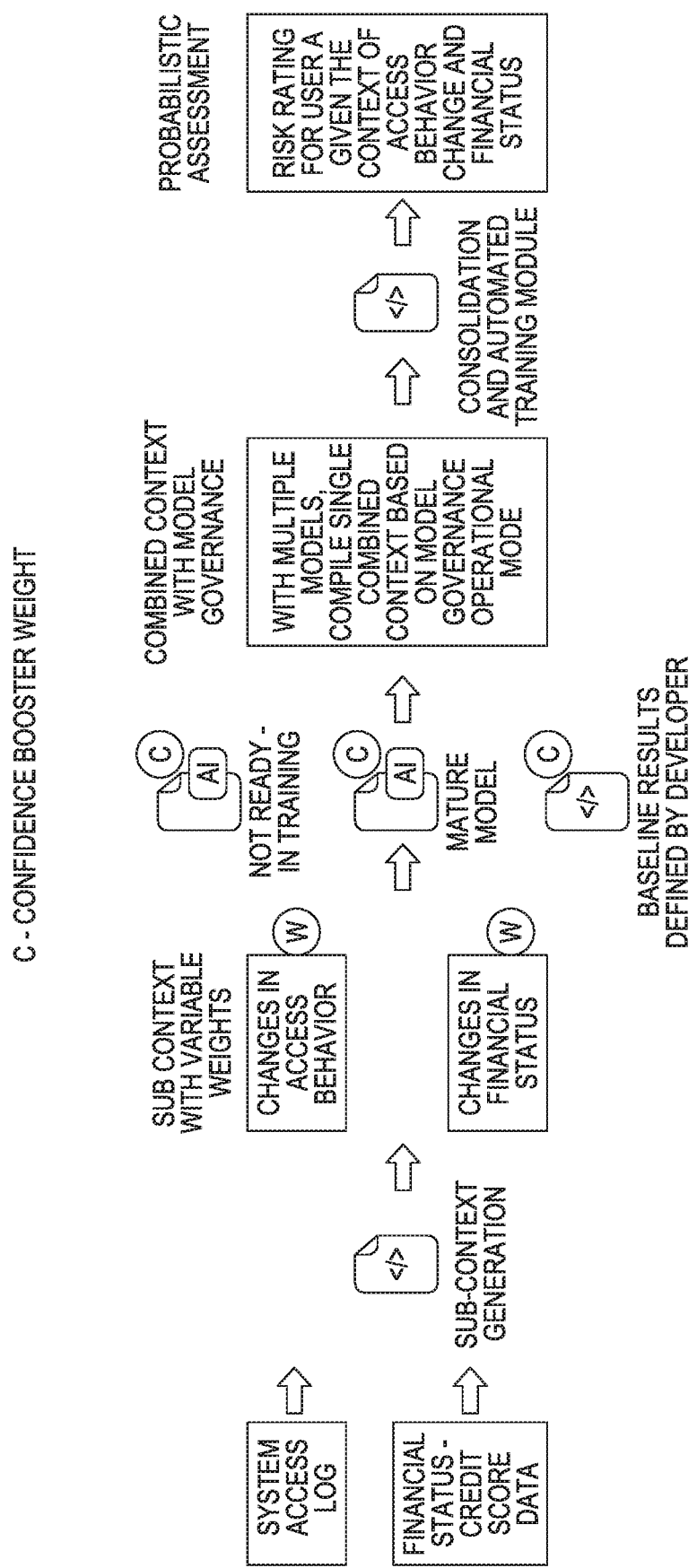

FIG. 23C is a flow chart depicting an AI solution of the AI platform that uses a combined context. In example embodiments, the combined context is derived from combining multiple layers of contexts (e.g., sub-contexts). For example, one or more sub-contexts (e.g., changes in access behavior, changes in financial status) are generated from one or more data sources system access logs, financial status data). Each sub-context may be assigned a variable weight, as described herein The sub-contexts and weights are used as input for multiple AIs (e.g., to train multiple models). The models are confidence booster is assigned to each model (e.g., based on its maturity), as described herein. A combined context is generated from the models using model governance (e.g., when the AI platform is in a model governance operational mode). Results of applications of the multiple AIs are consolidated to generate a probabilistic assessment (e.g., a risk rating for a user A given the context of changes in access behavior or changes in financial status).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a computer processor that is specially configured (e.g., using software), the computer processor may be specially configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

FIGS. 24A-24B are flow charts depicting wrapping and parsing of an Algo and executing the wrapped AI code respectively. As depicted in FIG. 24A, at 1, an Algo is uploaded at a front-end of the AI platform. At 2, the back-end, the AI platform (e.g., via the CodeX module) uploads code for parsing (e.g., via an algorithm API). At 3, the wrapped code is generated (e.g., via a code parser module and a runtime module). The wrapped code is then returned (e.g., to the CodeX module) for integration into the AI platform (e.g., to support execution of one or more of the AI governance operations discussed herein).

As depicted in FIG. 24B, the AI platform (e.g., via start.py module executing at a data layer), at 1, fetches input data (e.g., from one or more data sources). At 2, the input data is transformed (e.g., into a standardized format by transform.py module) for subsequent processing. At 3, weights are fetched (e.g., at a weights.py module via a weights API). In example embodiments, weights are assigned for each context or sub-context that the AI learns. At 4, guardrails are fetched (e.g., at a guardrails.py module via a guardrail API). In example embodiments, the guardrails comprise one or more rules for error tolerance, identification of data that is to be monitored, or identification of data for which alerts are to be generated. At 5, output is generated (e.g., by a primary.py module). At 6, it is determined whether guardrails are triggered (e.g., based on rules accessed by or specified in an index.py module). At 7, an index is saved to a database (e.g., by the index.py module via an Index API). In example embodiments, the index includes output from the AI Algo. While Python modules are depicted, implementation of these functions is not limited to Python.

Figure 25:
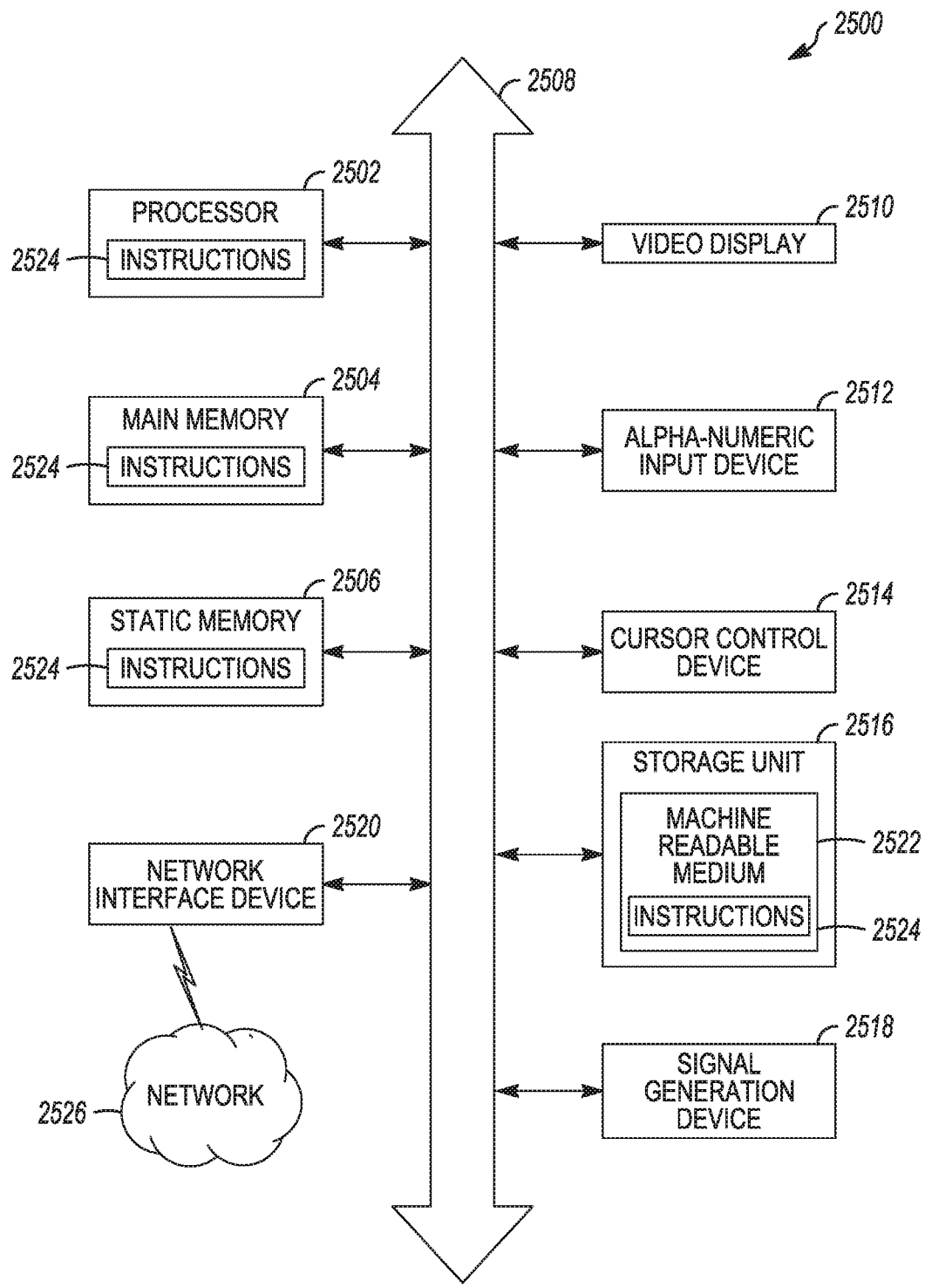
FIG. 25 is a block diagram of machine in the example form of a computer system within which instructions for causing the machine to perform any one or more of the methodologies discussed herein may be executed.

FIG. 25 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and Max networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
one or more computer processors;
one or more memories;
a set of instructions incorporated into the one or more memories, the set of instructions configuring the one or more computer processors to perform operations comprising:
generating one or more sub-contexts associated with a plurality of users from one or more data sources, the one or more sub-contexts representing one or more changes in data that are relevant to assessing one or more risks associated with the plurality of users;
providing the one or more sub-contexts as training data to a plurality of machine-learning models;
generating a plurality of probabilistic assessments for each of the plurality of users based on additional data received in real time, the plurality of probabilistic assessments including a first probabilistic assessment and a second probabilistic assessment, the first probabilistic assessment being from one or more deterministic models, the second probabilistic assessment being from the plurality of machine-learning models; and
based on a difference between the first probabilistic assessment of the plurality of probabilistic assessments for a user of the plurality of users and the second probabilistic assessment of the plurality of probabilistic assessments for the user being outside a tolerated range, causing presentation of a user interface to allow selection of the first probabilistic assessment or the second probabilistic assessment or, based on the difference being less than a threshold, applying a confidence boost factor to the second probabilistic assessment; and
providing the selection or the confidence boost factor as additional training data for the plurality of machine-learning models.

2. The system of claim 1, the operations further comprising providing a visual representation of a hierarchy of assets used to perform the generating of the plurality of probabilistic assessments, the assets including one or more tasks, one or metrics, one or more algorithms, and one or more data sources.

3. The system of claim 2, wherein the visual representation includes selectable user interface elements corresponding to a number of the one or more tasks, a number of the one or more algorithms, and a number of the one or more data sources.

4. The system of claim 3, wherein each of the selectable user interface elements is configured to cause a presentation in a dashboard user interface of a different view of the assets based on a selected level of the assets within the hierarchy.

5. The system of claim 1, the operations further comprising associating a confidence score with each of the plurality of machine-learning models, wherein the confidence score associated with each model of the plurality of machine-learning models is based on a maturity of the model.

6. The system of claim 1, wherein the one or more risks pertain to stealing of corporate assets or being negligible.

7. The system of claim 1, wherein the generating of the second probabilistic assessment includes combining output from the plurality of machine-learning models into a combined context.

8. The system of claim 7, the operations further comprising using the combined context to determine a final probabilistic risk associated with a user of the plurality of users.

9. The system of claim 1, wherein the one or more sub-contexts includes one or more of access behavior, communication behavior, financial status, performance, external device access, or sentiments associated with the plurality of users.

10. The system of claim 1, wherein the generating of the one or more sub-contexts includes using independent algorithms to compute changes in values to the additional data over time for each user and provide outputs to the plurality of machine-learning models.

11. The system of claim 1, wherein the plurality of machine-learning models is configured to add variable weights to each of the one or more sub-contexts.

12. A method comprising:
generating, using one or more computer processors of an AI platform, one or more sub-contexts associated with a plurality of users from one or more data sources, the one or more sub-contexts representing one or more changes in data that are relevant to assessing one or more risks associated with the plurality of users;
providing the one or more sub-contexts as training data to a plurality of machine-learning models;
generating a plurality of probabilistic assessments for each of the plurality of users based additional data received in real time, the plurality of probabilistic assessments including a first probabilistic assessment and a second probabilistic assessment, the first probabilistic assessment being from one or more deterministic models, the second probabilistic assessment being from the plurality of machine-learning models; and
based on a difference between the first probabilistic assessment of the plurality of probabilistic assessments for a user of the plurality of users and the second probabilistic assessment of the plurality of probabilistic assessments for the user being outside a tolerated range, causing presentation of a user interface to allow selection of the first probabilistic assessment or the second probabilistic assessment or, based on the difference being less than a threshold, applying a confidence boost factor to the second probabilistic assessment; and
providing the selection or the confidence boost factor as additional training data for the plurality of machine-learning models.

13. The method of claim 12, further comprising providing a visual representation of a hierarchy of assets used to perform the generating of the plurality of probabilistic assessments, the assets including one or more tasks, one or metrics, one or more algorithms, and one or more data sources.

14. The method of claim 13, wherein the visual representation includes one or more selectable user interface elements corresponding to a number of the one or more tasks, a number of the one or more algorithms, and a number of the one or more data sources.

15. The method of claim 14, wherein each of one or more selectable user interface elements is configured to cause a presentation in a dashboard user interface of a different view of the assets based on a selected level of the assets within the hierarchy.

16. The method of claim 12, wherein each one or more selectable user interface elements is configured to cause a presentation in a dashboard user interface of a different view of one or more assets based on a selected level of the one or more assets within a hierarchy.

17. A non-transitory computer-readable storage medium storing instructions thereon, which, when executed by one or more processors, cause one or more processors to perform operations comprising:
   generating one or more sub-contexts associated with a plurality of users from one or more data sources, the one or more sub-contexts representing one or more changes in data that are relevant to assessing one or more risks associated with the plurality of users;
   providing the one or more sub-contexts as training data to a plurality of machine-learning models;
   generating a plurality of probabilistic assessments for each of the plurality of users based on additional data received in real time, the plurality of probabilistic assessments including a first probabilistic assessment and a second probabilistic assessment, the first probabilistic assessment being from one or more deterministic models, the second probabilistic assessment being from the plurality of machine-learning models; and
   based on a difference between the first probabilistic assessment of the plurality of probabilistic assessments for a user of the plurality of users and the second probabilistic assessment of the plurality of probabilistic assessments for the user being outside a tolerated range, causing presentation of a user interface to allow selection of the first probabilistic assessment or the second probabilistic assessment or, based on the difference being less than a threshold, applying a confidence boost factor to the second probabilistic assessment; and
   providing the selection or the confidence boost factor as additional training data for the plurality of machine-learning models.

18. The non-transitory computer-readable storage medium of claim 17, the operations further comprising providing a visual representation of a hierarchy of assets used to perform the generating of the plurality of probabilistic assessments, the assets including one or more tasks, one or metrics, one or more algorithms, and one or more data sources.

19. The non-transitory computer-readable storage medium of claim 18, wherein the visual representation includes selectable user interface elements corresponding to a number of the one or more tasks, a number of the one or more algorithms, and a number of the one or more data sources.

20. The non-transitory computer-readable storage medium of claim 19, wherein each of the selectable user interface elements is configured to cause a presentation in a dashboard user interface of a different view of the assets based on a selected level of the assets within the hierarchy.

* * * * *